US012517578B2

(12) United States Patent
Miyao

(10) Patent No.: US 12,517,578 B2
(45) Date of Patent: *Jan. 6, 2026

(54) TRANSPARENT DISPLAY APPARATUS WHEREIN AN IMAGE IS DISPLAYED TO A SECOND USER ON THE OPPOSITE SIDE OF THE DISPLAY

(71) Applicant: Japan Display Inc., Tokyo (JP)

(72) Inventor: Makoto Miyao, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,086

(22) Filed: Jan. 5, 2024

(65) Prior Publication Data

US 2024/0241579 A1 Jul. 18, 2024

(30) Foreign Application Priority Data

Jan. 12, 2023 (JP) ................................ 2023-002947

(51) Int. Cl.
*G06F 3/01* (2006.01)
*G02F 1/1347* (2006.01)

(52) U.S. Cl.
CPC .......... *G06F 3/013* (2013.01); *G02F 1/13471* (2013.01)

(58) Field of Classification Search
None
See application file for complete search history.

(56) References Cited

U.S. PATENT DOCUMENTS

| | | | | |
|---|---|---|---|---|
| 2012/0019434 A1* | 1/2012 | Kuhlman | G02F 1/13306 | 345/1.3 |
| 2012/0256854 A1* | 10/2012 | Lee | G06F 1/1643 | 345/173 |
| 2014/0368442 A1* | 12/2014 | Vahtola | G06F 3/013 | 345/173 |
| 2015/0332091 A1* | 11/2015 | Kim | H04N 5/2621 | 382/103 |
| 2017/0060512 A1* | 3/2017 | Rakshit | G06F 3/041 | |
| 2017/0153379 A1* | 6/2017 | Chang | G02B 6/0081 | |
| 2017/0235360 A1* | 8/2017 | George-Svahn | G02B 27/017 | 345/173 |
| 2018/0033171 A1 | 2/2018 | Rakshit | | |
| 2022/0121070 A1* | 4/2022 | Bi | G02F 1/133615 | |

OTHER PUBLICATIONS

Li et al., Interactive Two-Sided Transparent Display: Designing for Collaboration, DIS '14: Proceedings of the 2014 conference on Designing interactive systems, Jun. 21-25, 2014 (Year: 2014).*

* cited by examiner

*Primary Examiner* — Benjamin C Lee
*Assistant Examiner* — Nathan P Brittingham
(74) *Attorney, Agent, or Firm* — Michael Best & Friedrich LLP

(57) ABSTRACT

A transparent display apparatus includes a first substrate having a first surface, a second substrate having a second surface, a display layer having pixels, a display region provided in a region where the first substrate, the second substrate, and the display layer overlap, a controller, and a sensor device for detecting a viewpoint of the first user. The controller displays a plurality of individually selectable selection images toward the first user in the display region (screen), determines a gaze image, which is the selection image gazed by the first user, from detection information of the sensor device, and controls a state of pixels so that the corresponding image based on the gaze image is displayed to the second user on an opposite side to the first user.

9 Claims, 18 Drawing Sheets

TRANSPARENT DISPLAY APPARATUS WHEREIN AN IMAGE IS DISPLAYED TO A SECOND USER ON THE OPPOSITE SIDE OF THE DISPLAY

CROSS-REFERENCE TO RELATED APPLICATION

The present application claims priority from Japanese Patent Application No. 2023-2947 filed on Jan. 12, 2023, the content of which is hereby incorporated by reference into this application.

TECHNICAL FIELD

The present invention relates to a transparent display apparatus.

BACKGROUND

In recent years, transparent display apparatuses (in other words, transparent displays) have been developed and provided. The transparent display apparatus displays images (in other words, video images or the like) in a light-transmissive display region made of a liquid crystal layer or the like. A person who is a user can visually recognize display images of the transparent display apparatus from a front surface side and a back surface side in a state of superimposing it with a background.

This transparent display apparatus is used for communication between people (for example, see Patent Document 1 (US patent Application Publication No. 2018/0033171). Patent Document 1 discloses that when performing the communication via a transparent display apparatus, a camera visually recognizes a person's visual line and the image is displayed at a position corresponding to the visual line.

SUMMARY

It is conceivable that the transparent display apparatus can be used for many use applications related to the communication between the people, and further technological development for this purpose is desired.

An object of the present invention is to provide a technique capable of extending the use application.

A transparent display apparatus that is one embodiment of the present invention includes: a first substrate having a first surface; a second substrate having a second surface on an opposite of the first surface; a display layer arranged between the first substrate and the second substrate, and having pixels that can transition between a transparent state of transmitting background light and a non-transparent state of displaying an image; a display region provided in a region where the first substrate, the second substrate, and the display layer overlap; a controller controlling a state of the pixels of the display layer; and the image displayed in the display region from a side of the first surface and a background on a side of the second surface being visible, and the image displayed in the display region from the second surface side and the background on the first surface side being visible, in which a sensor device for detecting a viewpoint of a first user on the first surface side of the display region is provided, and the controller: displays a plurality of individually selectable selection images toward the first user in the display region; determines a gaze image, which is the selection image gazed by the first user, from detection information of the sensor device; and controls the state of the pixels so that a corresponding image based on the gaze image is displayed to a second user on the opposite side of the first user in the display region.

DESCRIPTION OF THE PREFERRED EMBODIMENTS

Figure 1:
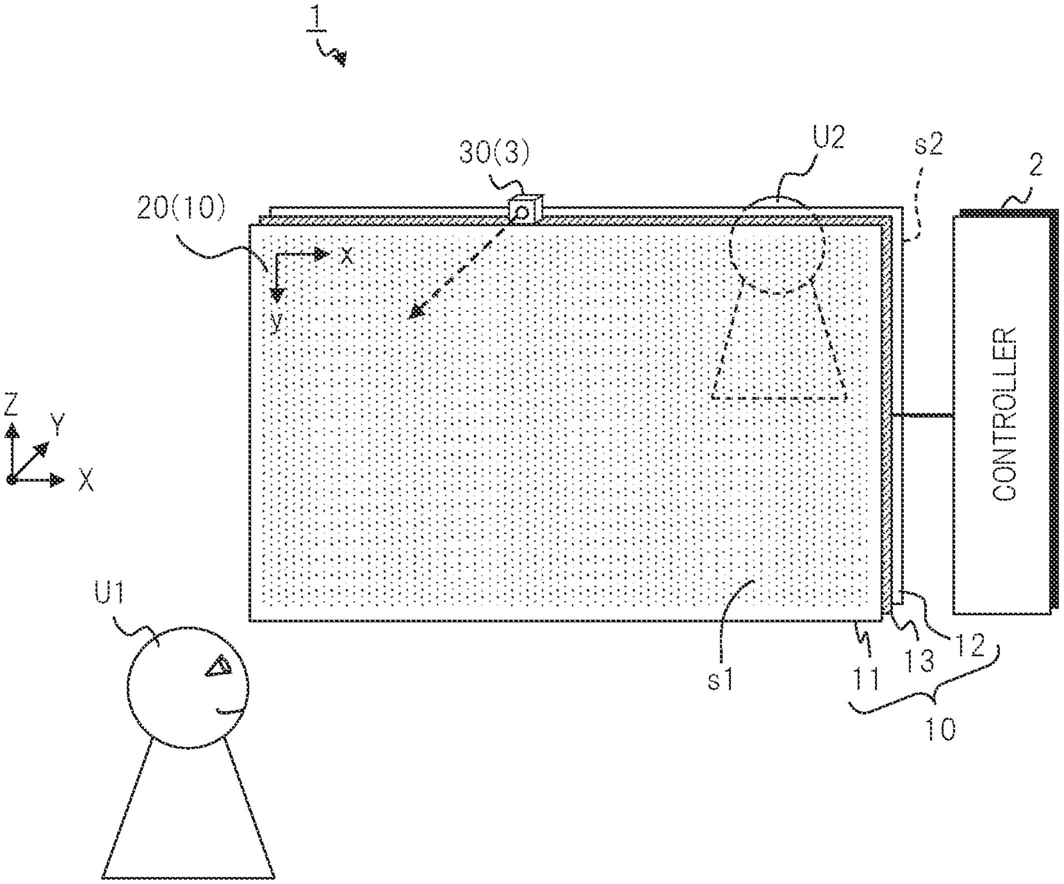
FIG. 1 is a diagram showing a schematic configuration of a transparent display apparatus according to a first embodiment.

Hereinafter, embodiments of the present disclosure will be described in detail with reference to the drawings. In the drawings, the same parts are denoted by the same reference numerals in principle, and a repetitive description thereof will be omitted. In the drawings, in order to facilitate understanding of the invention, components may be schematically represented about a width, a thickness, a shape, and the like of each part in comparison with the actual aspect, but this is merely one example and it is not intended to limit the interpretation of the present invention.

For the purpose of explanation, when explaining processings by programs, the programs, functions, processing units, and the like may be explained as a main body, but the main body of hardware for these is a processor or is a controller configured by the processor and the like, a device, a calculator, a system, and the like. The calculator executes the processing according to a program read onto a memory by the processor while appropriately using resources such as a memory and a communication interface. This realizes predetermined functions, processing units, and the like. The processor is configured by, for example, a semiconductor device such as a CPU/MPU or a GPU. The processing is not limited to software program processing, and can also be implemented by using a dedicated circuit. As the dedicated circuit, FPGA, ASIC, CPLD, and the like can be applied.

A program(s) may be installed in advance as data on a target calculator, or may be distributed as data from a program source to the target calculator. The program source may be a program distribution server on a communication network or be a non-transitory computer-readable storage medium such as a memory card or a disk. A program may be configured by multiple modules. A computer system may be configured by multiple devices. The computer system may be configured by a client/server system, a cloud computing system, an IoT system, and the like. Various types of pieces of data and information are configured with, for example, a structure such as a table or a list, but are not limited thereto. Expressions such as identification information, identifier, ID, name, and number can be replaced with each other.

First Embodiment

In reference with FIGS. 1 to 10, a transparent display apparatus according to a first embodiment will be described. FIG. 1 is a drawing showing a schematic configuration of a transparent display apparatus according to a first embodiment.

Note that for the purpose of explanation, (X, Y, Z) and (x, y) shown in the drawings may be used as a coordinate system and a direction. A X axis/X direction and a Y axis/Y direction in FIG. 1 are two orthogonal horizontal directions, and a Z axis/Z direction is a vertical direction. The X direction is a right-left direction as seen from a user of the transparent display apparatus, the Z direction is an up-down direction as seen from the user, and the Y direction is a front-back direction as seen from the user. Further, the x direction in FIG. 1 is a longitudinal direction (in-screen horizontal direction) that configures a screen of a transparent display apparatus, and the y direction is a traverse direction (in-screen vertical direction) that configures the screen.

[Overall of Transparent Display Apparatus]

As shown in FIG. 1, a transparent display 1, which is a transparent display apparatus according to a first embodiment, is used by a first user U1 as a first operator and a second user U2 as a second operator user, and the user U1 and the second user U2 face each other so as to sandwich a transparent display panel 10 of the transparent display 1 therebetween. FIG. 1 schematically shows a situation in which the two users as a first user U1 and a second user U2 use the transparent display 1. In this example, the first user U1 uses the transparent display 1 from a first surface s1 side which is a front surface of the transparent display panel 10, and the second user U2 uses the transparent display 1 from a second surface s2 side which is a back surface of the transparent display panel 10. Of course, the first user U1 may use the transparent display 1 from the second surface s2 side, and the second user U2 may use the transparent display 1 from the first surface s1 side.

The transparent display 1 includes a light-transmissive display panel 10, a controller 2 connected to or built into the transparent display panel 10, and an eye tracking device 3 including a first camera 30.

The transparent display panel 10 is, for example, a liquid crystal display panel. A screen 20 of the transparent display panel 10 is configured by a plurality of members. The transparent display panel 10 includes, for example, a first substrate 11, a second substrate 12, and a display layer 13 as members configuring the screen 20. The first substrate 11 is an opposite substrate, the second substrate 12 is an array substrate, and the display layer 13 is a liquid crystal layer. Pixels PIX of display layer 13 emit light in all directions. Although details will be described later, the display layer 13 has a plurality of pixels PIX that configure a display region of the screen 20 (see FIG. 3 or the like). Of course, the first substrate 11 may be used as an array substrate, and the second substrate 12 may be used as an opposite substrate.

In the first embodiment, the transparent display (in other words, a liquid crystal display) 1 having a liquid crystal layer as the display layer 13 of the transparent display panel 10 will be described. Note that in the first embodiment, used as the transparent display panel 10 of the transparent display 1 is a liquid crystal panel realizing a transmittance of 84% or more, the transmittance indicating a degree of transparency of the display region of the screen 20, the transmittance being about equal to the transmittance of a window glass.

The transparent display panel 10 has a first surface s1 on a first substrate 11 side and a second surface s2 on a second substrate 12 side. For the purpose of explanation, the first surface s1 is assumed to be a front surface (in other words, a front), and the second surface s2 is assumed to be a back surface (in other words, a back). By controlling the display layer 13, the transparent display 1 cannot only display an image toward the first user U1 on the first surface s1 side but also display an image toward the second user U2 on the second surface s2 side. In the transparent display 1, when the image is displayed on the screen 20 of the transparent display panel 10 according to the control of the display layer 13, the image can be visually recognized from not only the first user U1 on the first surface s1 side but also the second user U2 on the second surface s2 side s1. Note that in FIG. 1, the display image on the screen 20 is schematically shown as dot patterns.

The controller 2 is electrically connected to the transparent display panel 10, and controls the display layer 13 included in the transparent display panel 10. The controller 2 causes the screen 20 to display the image by controlling a display state of the pixels of the display layer 13 which is a liquid crystal layer. The controller 2 may be built into the transparent display panel 10 or may be connected to an outside of the transparent display panel 10. For example, in addition to a drive circuit or the like, a control circuit configurating the controller 2 may be mounted on a portion of the first substrate 11 or the second substrate 12. In addition thereto, The controller 2 may be an external computer such as a personal computer (PC) connected to the transparent display panel 10. Although not shown, a microphone, a speaker, a lamp, and the like may be installed and connected to the transparent display panel 10.

The eye tracking device 3 is used, for example, when the transparent display 1 is used as a communication tool between the first user U1 and the second user U2, as described later. The eye tracking device 3 is a sensor device for detecting a viewpoint of the first user on the first surface s1 side of the transparent display panel 10. In the first embodiment, the eye tracking device 3 is a sensor device that detects a viewpoint of the first user U1 as the first operator on the first surface s1 side of the transparent display panel 10, and detects the viewpoint of the first user U1, and has the first camera 30 photographing the image for detecting the viewpoint of the first user U1. The first camera 30 is installed so as to face the first surface s1 side of the screen 20 and, by this first camera 30, an image for identifying movement (in particular, movement of pupils) of an eye of the first user U1 is photographed. The first camera 30 is provided, for example, at a top of the transparent display panel 10 so as to be able to photograph a face of the first user U1 from a front.

An installation location of the first camera 30 is not particularly limited as long as it can capture the movement of the eye of the first user U1, and the location does not necessarily have to be on the transparent display panel 10. The first camera 30 is a CCD camera or the like in this example, but is not limited to this, and may be any camera that can photograph the movement of the eye of the first user U1. Further, in this example, the first camera 30 transmits the photographed image to the controller 2, and the controller 2 performs an image processing based on the photographed image (in other words, camera image), thereby detecting the viewpoint of the first user U1. That is, the controller 2 also functions as part of the eye tracking device 3.

Note that the existing device 3 may adopt an already-existing device(s), and its configuration is not particularly limited. As one example, the eye tracking device 3 analyzes the image photographed by the first camera 30, and detects the viewpoint of the first user U1 from the movement of the eyes (in particular, the movement of the pupils) of the first user U1. Further, the eye tracking device 3 may detect the viewpoint (in other words, visual line direction) of the first user U1 by using corneal reflection of infrared rays, for example.

Furthermore, the transparent display 1 can switch at least between a transparent state of transmitting the background and a non-transparent state of displaying the image for each pixel on the screen 20 of the transparent display panel 10. In other words, the transparent display 1 can switch, as control of transparency of the transparent display panel 10, a transparent state where the transparency is in an on state and a non-transparent state where the transparency is in an off state. The non-transparent state is a state in which the image displayed on the screen 20 is easier for the user to visually recognize than the background in comparison with the transparent state, and the transparent state is a state in which the image displayed on the screen 20 is easier for the user to visually recognize than the background. Furthermore, the transparent state may simply be referred to as an image non-display state, and the non-transparent state may be referred to as an image display state, or the transparent state may be replaced as a non-scattering state, and the non-transparent state may be replaced as a scattering state, as will be described later. Note that the control for each pixel of the screen 20 by the transparent display 1 is limited to changing the degree of transparency (sometimes referred to as transparency) between the transparent state and the non-transparent state by using a binary value of on/off, and it may be changed in multiple values.

Such a transparent display 1 can be installed and used at any position. The transparent display 1 can be installed, for example, at a counter or window where people meet, a partition between people, or the like. Furthermore, the use of the transparent display 1 is not necessarily limited to being installed at a specific location. For example, by employing the relatively small transparent display panel 10, it is possible for the operator to use the transparent display 1 while holding it in an operator's hand.

As will be described in detail later, this transparent display 1 is used as the communication tool between the first user U1 and the second user U2. The transparent display 1 can be effectively used, for example, in a medical field for the communication between the first user U1 who is a patient with general paralysis and the second user U2 who is a doctor.

[Basic Characteristics of Transparent Displays]

Figure 2A:
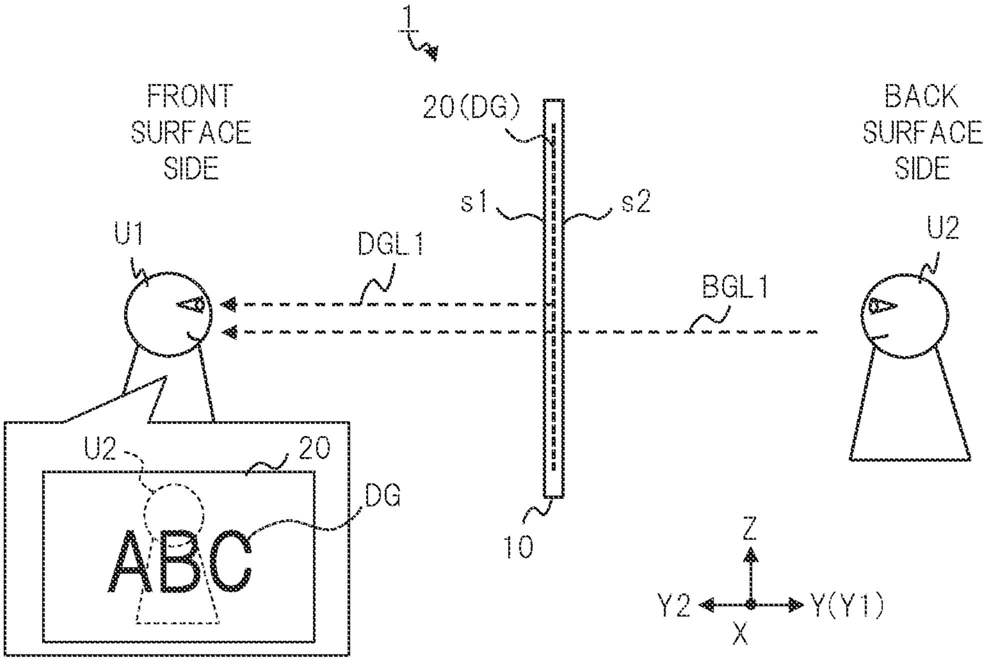
FIG. 2A is a diagram for explaining a basic characteristic of the transparent display apparatus of the first embodiment.
Figure 2B:
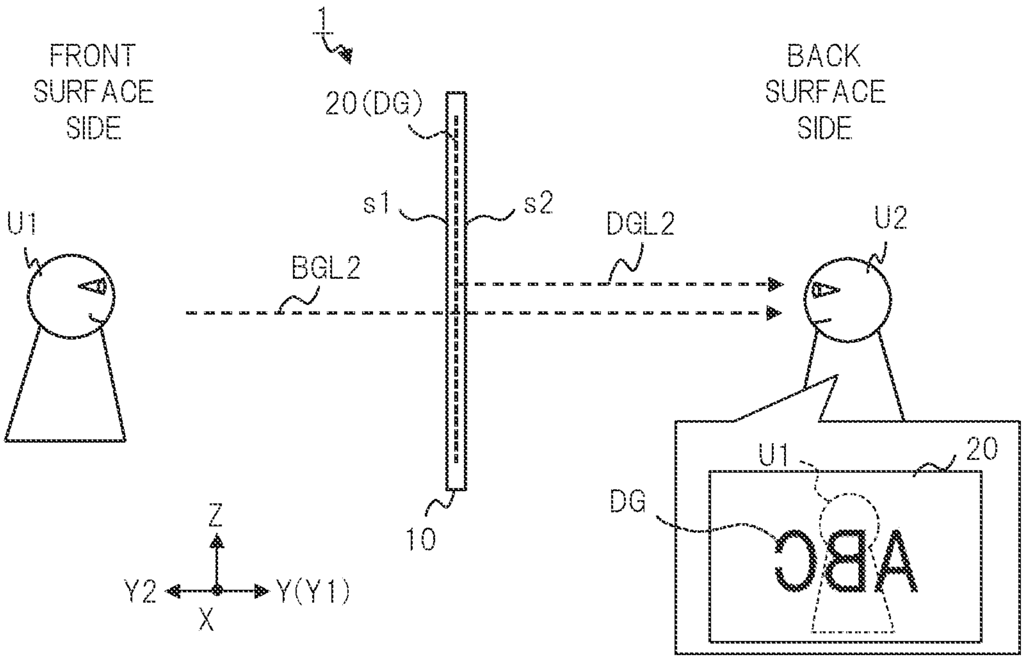
FIG. 2B is a diagram for explaining the basic characteristic of the transparent display apparatus of the first embodiment.

FIG. 2 is a diagram of the transparent display panel viewed in the X direction, and is a diagram for explaining the state of the display image displayed on the screen. FIG. 2A shows a state in which the first user U1 located on a front side (direction Y2) with respect to the first surface s1, which is the front surface of the transparent display 1, visually recognizes a display image DG displayed on the screen 20. On the contrary, FIG. 2B shows a state in which the second user U2 located on the front side (direction Y1) with respect to the second surface s2, which is the back surface of the transparent display 1, visually recognizes the display image DG displayed on the screen 20.

As described above, the transparent display 1 is such a display device to: allow the first user U1 to visually recognize the display image DG displayed on the screen 20 of the transparent display panel 10 from the first surface s1 side of the screen 20; and also allows the second user U2 to visually recognize the display image DG displayed on the screen 20 of the transparent display panel 10 from the second surface s2 of the screen 20.

The transparent display panel 10 has visible characteristics in which the display image DG displayed on the screen 20 and the second user U2 on the second surface s2 side can be visually recognized from the first user U1 on the first surface s1 side. The transparent display panel 10 also has visible characteristics in which the display image DG displayed on the screen 20 and the first user U1 on the first surface s1 side can be visually recognized from the second user U2 on the second surface s2 side. In the transparent display 1, when the image is displayed in the display region of the screen 20 toward the first user U1 on the first surface s1 side, the image is also visibly recognized from the second user U2 on the second surface s2 side.

For example, as shown in FIG. 2, it is assumed that the transparent display 1 displays a character image of “ABC” toward the first surface s1 as the display image DG. The first user U1 views the screen 20 of the transparent display panel 10 in a direction (direction Y1) from the first surface s1 side to the second surface s2 side. Therefore, the first user U1 can visually recognize the display image DG on the screen 20, for example, the character image of "ABC" corresponding to image light DGL1, as shown in FIG. 2A. At this time, the first user U1 can visually recognize, via the screen 20, the second user U2 on the second surface s2 side and background light BGL1 corresponding thereto.

Meanwhile, the second user U2 views the screen 20 of the transparent display panel 10 in a direction (direction Y2) from the second surface s2 side to the first surface s1 side. The second user U2 can visually recognize the display image DG displayed on the screen 20, for example, the character image corresponding to image light DGL2, as shown in FIG. 2B. Further, the second user U2 can visually recognize, via the screen 20, the first user U1 on the first surface s1 side and background light BGL2 corresponding thereto.

However, the display image DG seen by the second user U2 is just the image viewed from the second surface s2 side of the screen 20, and is different from the display image DG viewed from the first surface s1 side. The display image DG viewed from the second user U2 is an image obtained by reversing the characters "ABC" in the right-left direction, as shown in FIG. 2B.

Note that at least the display region, in which the image is displayed, among the first surface s1 of the screen 20 has the above characteristics, in other words, background transparency. Similarly, at least the display region, in which the image is displayed, among the second surface s2 of the screen 20 has the above characteristics. A peripheral region (FIG. 3 described later) other than the display region among the first surface s1 and the second surface s2 of the screen 20 may be configured to have the same characteristics as mentioned above, or may be configured to have light-blocking characteristics of not transmitting the background.

[Hardware Configuration Example of Transparent Display]

Figure 3:
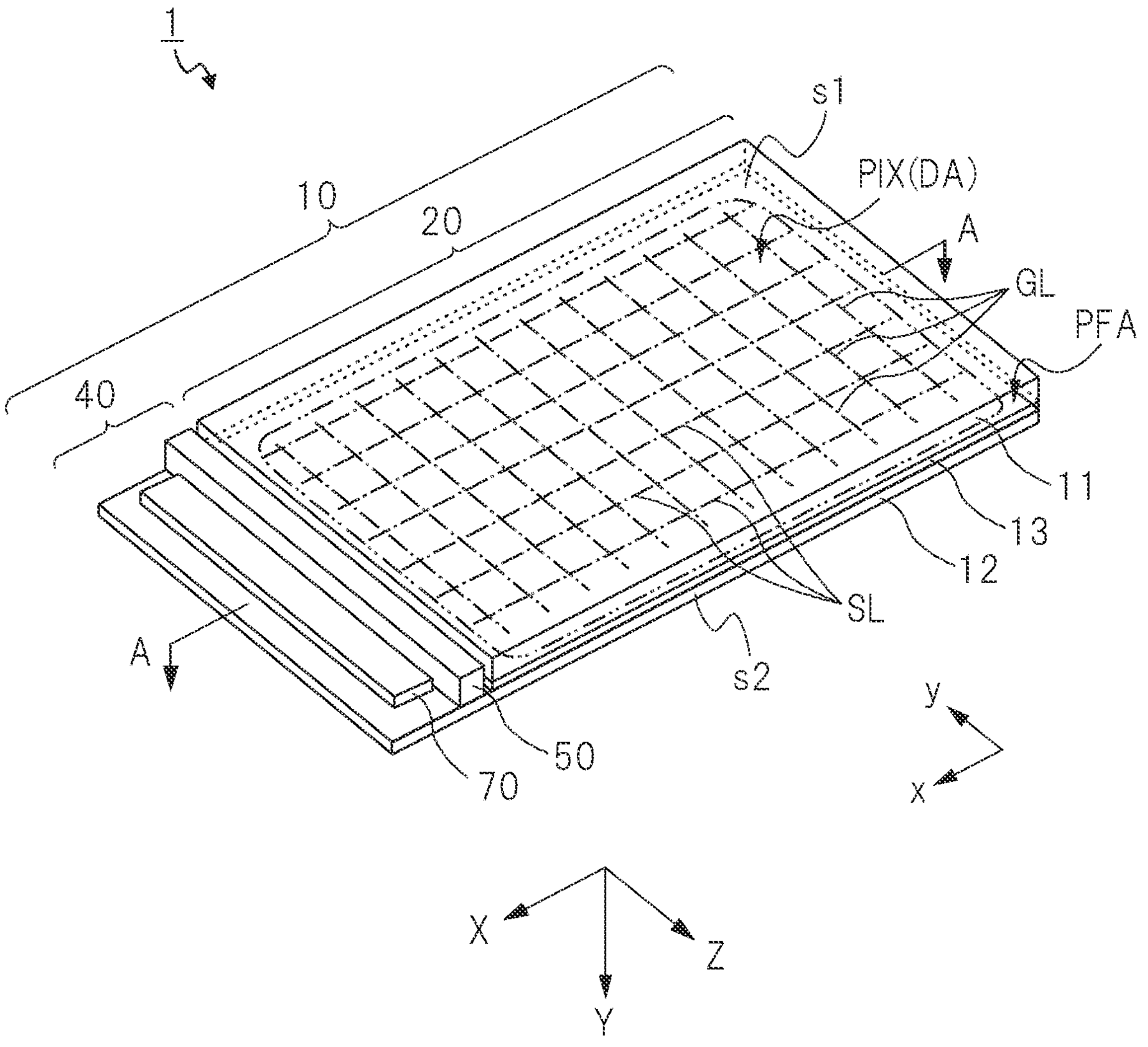
FIG. 3 is a perspective view showing a hardware configuration example of the transparent display apparatus according to the first embodiment.
Figure 4:
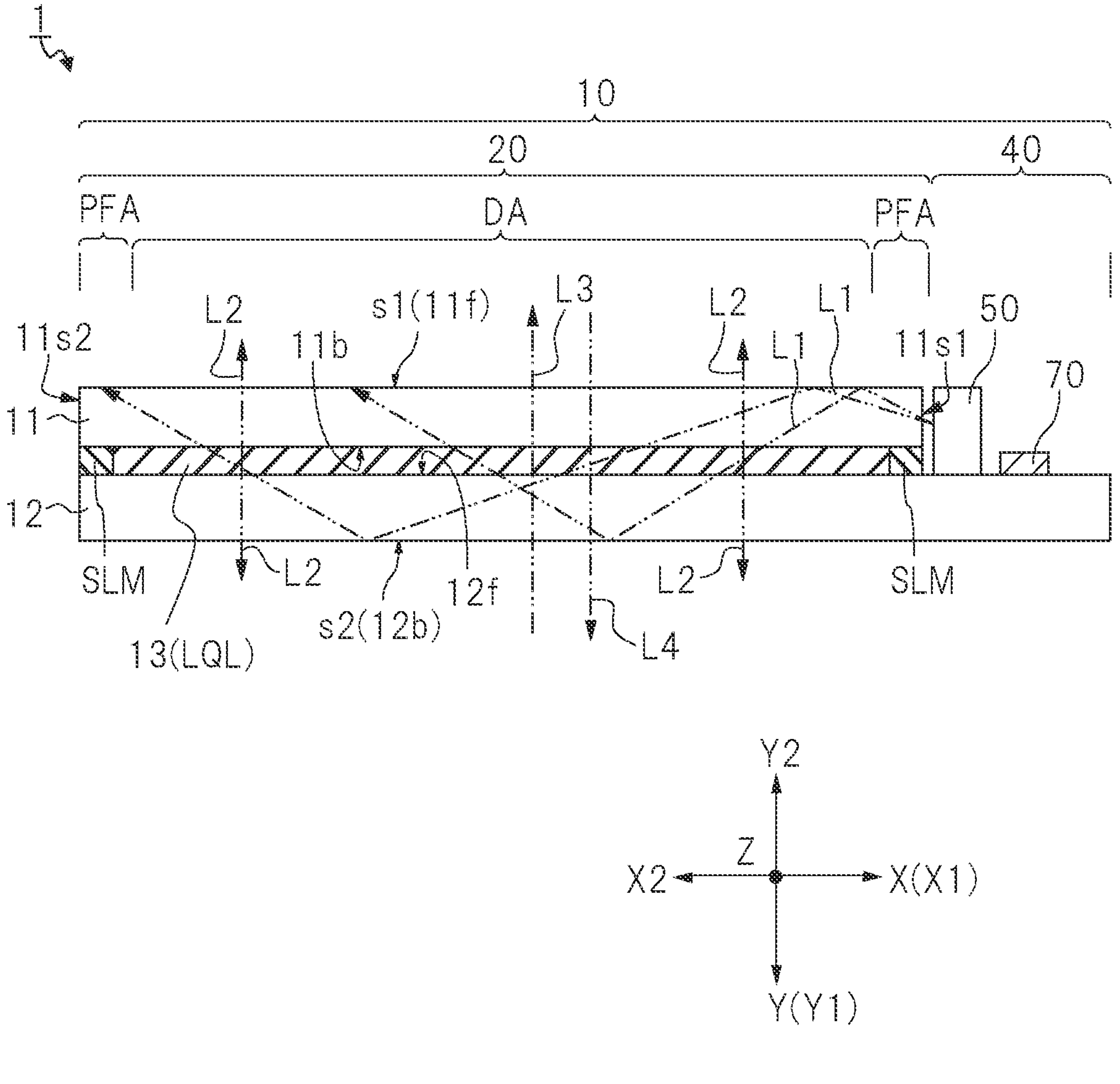
FIG. 4 is a cross-sectional view of the transparent display apparatus of the first embodiment.
Figure 5:
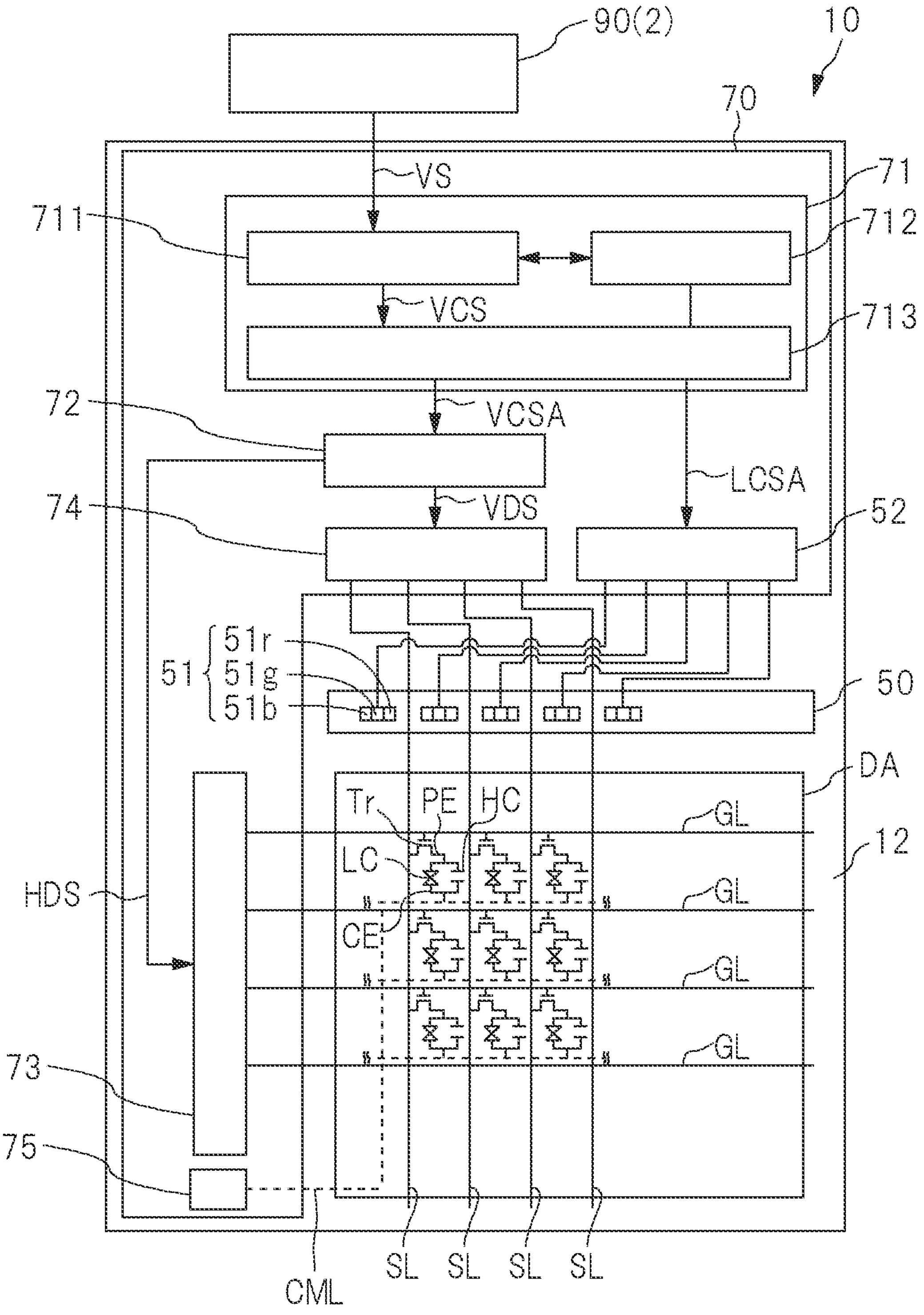
FIG. 5 is a diagram showing a configuration example of circuits in the transparent display apparatus of the first embodiment.

A hardware configuration example of the transparent display 1 according to the first embodiment will be explained by using FIGS. 3 to 5. FIG. 3 is a perspective view showing an outline of a configuration example of the transparent display panel of the transparent display, and is a perspective view of the transparent display panel 10 mainly viewing from the first surface s1. FIG. 4 is a cross-sectional view taken along line A-A in FIG. 3, and schematically shows a path or the like of light emitted from a light source unit of the transparent display. FIG. 5 shows a configuration example of circuits formed in the transparent display.

In FIG. 3, according to the coordinate system of FIG. 1, a direction along a thickness direction of the transparent display panel 10 is defined as a Y direction, and an extension direction of one side of the transparent display panel 10 is defined as a X direction in a X-Z plane orthogonal to the Y direction. A direction intersecting with the X direction is defined as a Z direction. Furthermore, as for the coordinate system (x, y) within the screen 20, a x direction corresponding to the X direction is a lateral direction (in-screen horizontal direction), and a y direction corresponding to the Z direction is a longitudinal direction (in-screen vertical direction). In this example, the screen 20 is a laterally long screen in which a size in the X direction (x direction) is larger than a size in the Z direction (y direction). However, a shape of the screen 20 is not limited to this.

As shown in FIGS. 3 and 4, the transparent display panel 10 includes the above-described first substrate 11, second substrate 12, and display layer 13, and further includes a light source unit 50 and a drive circuit 70. The first substrate 11, display layer 13, and second substrate 12 that configure the transparent display panel 10 are arranged in this order from the first surface s1 side, which is the front surface, in the Y direction.

The first surface s1 of the transparent display panel 10 is provided with a display region DA and a peripheral region PFA corresponding to the screen 20. Note that in this example, the peripheral region PFA becomes also part of the screen 20, but only the display region DA may be the screen 20. The display region DA of the screen 20 is located in a region where the first substrate 11, the second substrate 12, and the display layer 13 overlap as viewed in a plan view in the Y direction. The peripheral region PFA is present outside the display region DA. In FIG. 3, a boundary between the display region DA and the peripheral region PFA is indicated by a dash-double-dot line.

The display region DA is a region where the image is formed according to an input signal supplied from the outside. The display region DA is an effective region where the image is displayed when the first surface s1 or the second surface s2 is viewed in a plan view, for example, in the Y direction. A plurality of pixels PIX are formed in a matrix on the display layer 13 corresponding to the display region DA. The peripheral region PFA is a region including four sides around the display region DA, in other words, a frame region, and no image is displayed.

In this example, the second substrate 12 has a larger width in the X direction than the first substrate 11. The second substrate 12 has a region 40 extended on one side in the X direction. The light source unit 50 and the drive circuit 70 are mounted in the region 40.

In this example, the light source unit 50 is arranged along the peripheral region PFA on a right side with respect to the screen 20, as shown in FIG. 4. The light source unit 50 generates light source light for liquid crystal display on the display layer 13 and supplies it to the display layer 13.

The drive circuit 70 generates electrical signals for driving the first substrate 11, the second substrate 12, the display layer 13, and the light source unit 50, and supplies them to each unit. In FIG. 3, among the circuits included in the transparent display panel 10, a gate line GL and a source line SL, which will be described later and which are part of a signal wiring transmitting a signal for driving liquid crystal corresponding to the pixels PIX, are schematically shown by dash-single-dot lines.

Besides components shown in FIGS. 3 and 4, the transparent display panel 10 may also include, for example, a flexible printed circuit board, a casing, and the like. As the casing, an element(s) for fixing the first substrate 11, display layer 13, and second substrate 12 is recited. This element is omitted in FIGS. 3 and 4. In addition, although the display region DA is a quadrangle in this example, it is not limited to this and may have another shape such as a polygon or a circle. Further, in this example, the light source unit 50 and the drive circuit 70 are mounted on the region 40 of the second substrate 12, but the light source unit 50 and the drive circuit 70 may be mounted on a different substrate from that of the transparent display panel 10. For example, a light source substrate mounting the light source unit 50 and a drive circuit substrate mounting the drive circuit 70 may be attached to the peripheral region PFA of the transparent display panel 10.

An optical path of the light emitted from the light source unit 50, a state of the liquid crystal, or the like will be explained with reference to FIG. 4. The transparent display panel 10 includes the first substrate 11 and the second substrate 12 that are bonded so as to oppose each other via a liquid crystal layer LQL as the display layer 13. The first substrate 11 and the second substrate 12 are arranged in the Y direction, which is the thickness direction of the transparent display panel 10, via the liquid crystal layer LQL. In other words, the first substrate 11 and the second substrate 12 are arranged so as to oppose each other in the Y direction.

The second substrate 12, which is an array substrate, has a front surface 12*f* opposing the liquid crystal layer LQL and the first substrate 11. The opposite substrate, which is the first substrate 11, has a front surface 12*f* of the second substrate 12 and a back surface 11*b* opposing the liquid crystal layer LQL. The liquid crystal layer LQL containing the liquid crystal is located between the front surface 12*f* of the second substrate 12 and the back surface 11*b* of the first substrate 11. In other words, the liquid crystal layer LQL is an optical modulation element.

The second substrate 12 is an array substrate in which a plurality of transistors (in other words, transistor elements) as switching elements (in other words, active elements) described later are arranged in an array. The first substrate 11 means a substrate arranged opposite to the second substrate 12, which is an array substrate, and can be referred to as an opposite substrate.

The transparent display panel 10 has a function of modulating the light passing through the liquid crystal of the liquid crystal layer LQL by controlling a state of an electric field formed around the liquid crystal layer LQL via the above switching element. The display region DA is provided in a region overlapping with the liquid crystal layer LQL.

The first substrate 11 and the second substrate 12 are bonded together via a seal portion (in other words, a seal material) SLM. The seal portion SLM is arranged to surround the display region DA. The liquid crystal layer LQL is located inside the seal portion SLM. The seal portion SLM plays a role of sealing the liquid crystal between the first substrate 11 and the second substrate 12 and plays a role as an adhesive for bonding the first substrate 11 and the second substrate 12 together.

The light source unit 50 is arranged at a position of opposing one side surface 11*s*1 of the first substrate 11. In FIG. 4, the light source light L1, which is the light emitted from the light source unit 50, is schematically shown by dash-double-dot lines. The light source light L1 emitted from the light source unit 50 in the X direction propagates in a direction away from the side surface 11*s*1, in this example, in the direction X2. In a propagation path of the light source light L1, the back surface 12*b* of the second substrate 12 and the front surface 11*f* of the first substrate 11 are interfaces between a medium with large refractive index and a medium with small refractive index. Therefore, when an incident angle in which the light source light L1 is incident on the front surface 11*f* and the back surface 12*b* is larger than a critical angle, the light source light L1 is totally reflected on the front surface 11*f* and the back surface 12*b*.

The liquid crystal of the liquid crystal layer LQL is a polymer dispersed liquid crystal, and contains a liquid crystal polymer and liquid crystal molecules. The liquid crystalline polymer is formed into stripes, and the liquid crystal molecules are dispersed in the gaps between the liquid crystalline polymers. Each of the liquid crystalline polymer and liquid crystal molecules has optical anisotropy or refractive index anisotropy. Responsiveness of liquid crystalline polymers to electric fields is lower than responsiveness of the liquid crystalline polymers to electric fields. An orientation direction of the liquid crystalline polymer hardly changes regardless of presence or absence of the electric field.

Meanwhile, an orientation direction of the liquid crystal molecules changes depending on the electric field when a high voltage equal to or higher than a threshold is applied to the liquid crystal. When no voltage is applied to the liquid crystal, respective optical axes of the liquid crystalline polymer and the liquid crystal molecules are parallel to each other, and the light source light L1 incident on the liquid crystal layer LQL is hardly scattered in the liquid crystal layer LQL and passes through it. Such a state may be referred to as a transparent state (non-scattering state).

When a voltage is applied to the liquid crystal, the respective optical axes of the liquid crystal polymer and liquid crystal molecules intersect with each other, and the light source light L1 incident on the liquid crystal is scattered in the liquid crystal layer LQL. Such a state may be referred to as a scattering state (in other words, a non-transparent state).

The drive circuit 70 provided in the transparent display panel 10 and the controller 2 as a control circuit connected to the drive circuit 70 control the display state of the screen 20 by controlling an orientation of the liquid crystal in the propagation path of the light source light L1. In the scattering state, the light source light L1 is emitted as the emission light L2 by the liquid crystal to the outside of the transparent display panel 10 from the first surface s1 side, which is the front surface 11*f*, and the second surface s2 side, which is the back surface 12*b*.

Further, the background light L3 incident from the second surface s2 of the transparent display panel 10, which is the back surface 12*b*, passes through the second substrate 12, the liquid crystal layer LQL, and the first substrate 11, and is emitted to the outside from the first surface s1 of the transparent display panel 10, which is the front surface 11*f*. The background light L4 incident from the first surface s1, which is the front surface 11*f*, passes through the first substrate 11, the liquid crystal layer LQL, and the second substrate 12, and is emitted to the other from the second surface s2 of the transparent display panel 10, which is the back surface 12*b*.

As described above, these emission light L2 and background light L3 are visually recognized from the first user U1 on the front side, which is the first surface s1. The emission light L2 corresponds to image light DGL1, and background light L3 corresponds to background light BGL1. The first user U1 can recognize the emission light L2 and the background light L3 in combination. In other words, the first user U1 can recognize a state in which the emission light L2 is superimposed on the background light L3.

As described above, the emission light L2 and the background light L4 are visually recognized from the second user U2 on the second surface s2 side, which is the back surface. The emission light L2 corresponds to image light DGL2, and the background light L4 corresponds to background light BGL2. The second user U2 can recognize the emission light L2 and the background light L4 in combination. In other words, the second user U2 can recognize a state in which the emission light L2 is superimposed on the background light L4.

In the example shown in FIG. 4, in order to ensure visible light transmittance of the first surface s1, which is the front surface, and the second surface s2, which is the back surface, of the transparent display panel 10, the light source unit 50 is arranged at a position that does not overlap the display region DA in a plan view. Further, the transparent display panel 10 reflects the light source light L1 by utilizing a difference in refractive index between the first substrate 11 and second substrate 12, which function as light guide members, and a surrounding air layer. Consequently, in the transparent display panel 10, light can be delivered to the side surface 11*s*2 on an opposite side, which opposes the light source unit 50.

A configuration example of circuits included in the transparent display panel 10 will be described with reference to FIG. 5. FIG. 5 shows a configuration example of the drive circuit 70, the light source unit 50, and the pixels PIX (FIG. 3) in the display region DA.

As shown in FIG. 5, a control unit 90 including the control circuit that controls the image display is connected to the drive circuit 70. This control unit 90 corresponds to the controller 2 in the first embodiment. Note that the control unit 90 (in other words, the controller 2) does not need to be provided as a separate member different from the transparent display panel 10, and may be mounted on the transparent display panel 10 together with the drive circuit 70, for example.

The drive circuit 70 includes a signal processing circuit 71, a pixel control circuit 72, a gate drive circuit 73, a source drive circuit 74, a common potential drive circuit 75, and a light source control unit 52. Further, the light source unit 50 includes, for example, a light emitting diode element 51*r* (for example, red), a light emitting diode element 51*g* (for example, green), and a light emitting diode element 51*b* (for example, blue).

The signal processing circuit 71 includes an input signal analysis unit 711, a storage unit 712, and a signal adjustment unit 713. An input signal VS is inputted to the input signal analysis unit 711 of the signal processing circuit 71 from the control unit 90 via a wiring path such as a flexible printed circuit board (not shown). The input signal analysis unit 711 performs an analysis processing based on the input signal VS inputted from the control unit and generates an input signal VCS. The input signal VCS is, for example, a signal determining what kind of gradation value is given to each pixel PIX (FIG. 3) based on the input signal VS.

The signal adjustment unit 713 generates an input signal VCSA from the input signal VCS inputted from the input signal analysis unit 711. The signal adjustment unit 713 sends the input signal VCSA to the pixel control circuit 72 and sends a light source control signal LCSA to the light source control unit 52. The light source control signal LCSA is, for example, a signal containing information on a light amount of the light source unit 50 that is set according to the gradation value inputted to the pixels PIX.

The pixel control circuit 72 generates a horizontal drive signal HDS and a vertical drive signal VDS based on the input signal VCSA. For example, in this embodiment, the plurality of pixels PIX are driven in a field sequential method. Therefore, in the pixel control circuit 72, the horizontal drive signal HDS and the vertical drive signal VDS are generated for each color that the light source unit 50 can emit.

The gate drive circuit 73 sequentially selects the gate lines GL (in other words, signal wiring) of the transparent display panel within one vertical scanning period based on the horizontal drive signal HDS. The order of the selection of gate lines GL is arbitrary. As shown in FIG. 3, the plurality of gate lines GL extend in the X direction (x direction) and are arranged along the Z direction (y direction).

The source drive circuit 74 supplies a gradation signal corresponding to an output gradation value of each pixel PIX to each source line SL (in other words, signal wiring) of the transparent display panel within one horizontal scanning period based on the vertical drive signal VDS. As shown in FIG. 3, the plurality of source lines SL extend in the Z direction (y direction) and are arranged along the X direction (x direction). One pixel PIX is formed at each intersection between the gate lines GL and the source lines SL.

The switching element Tr is formed at each portion in which the gate lines GL and source lines SL are intersected with each other. The plurality of gate lines GL and the plurality of source lines SL correspond to a plurality of signal wirings that transmit drive signals for driving the liquid crystal of the liquid crystal layer LQL in FIG. 4.

For example, a thin film transistor is used as the switching element Tr. The type of thin film transistor is not particularly limited. One of the source electrode and the drain electrode of the switching element Tr is connected to the source line SL, the gate electrode is connected to the gate line GL, and the other of the source electrode and drain electrode is connected to one end of the capacitor of a polymer dispersed liquid crystal LC (corresponding to the liquid crystal layer (corresponding to the liquid crystal of the liquid crystal layer LQL of FIG. 4). The one end of the capacitor of the polymer dispersed liquid crystal LC is connected to the switching element Tr via a pixel electrode PE, and the other end is connected to a common potential wiring CML via a common electrode CE. Further, retention capacity HC is generated between the pixel electrode PE and a retention capacity electrode electrically connected to the common potential wiring CML. The common potential wiring CML is supplied by the common potential drive circuit 75. The wiring path connected to the common electrode CE in FIG. 5 is formed, for example, on the first substrate 11 in FIG. 3. In FIG. 5, the wirings formed on the first substrate 11 are illustrated by dotted lines.

In the configuration example shown in FIG. 5, the light source control unit 52 is included in the drive circuit 70. As a modification example, the light source control unit 52 may be provided separately from the drive circuit 70. As described above, when the light source unit 50 is mounted on a light source substrate different from the second substrate 12, the light source control unit 52 may be formed on the different light source substrate, or may be formed on an electronic component(s) mounted on the different light source substrate.

[Controller]

Figure 6:
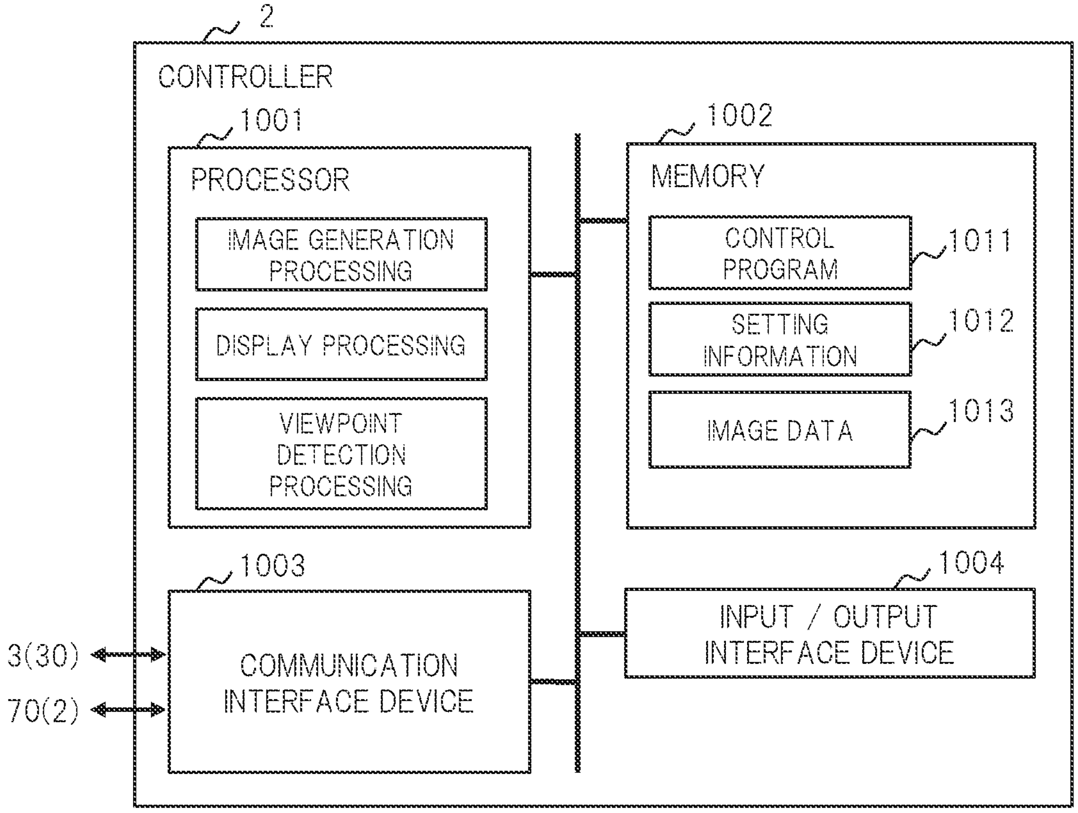
FIG. 6 is a diagram showing a configuration example of a controller in the transparent display apparatus of the first embodiment.

FIG. 6 is a functional block diagram showing a configuration example of the controller 2, which is a control device. As shown in FIG. 6, the controller 2 includes a processor 1001, a memory 1002, a communication interface device 1003, an input/output interface device 1004, and the like, which are interconnected via a bus(es) or the like. The processor 1001 executes a processing according to a control program 1011. Consequently, predetermined functions, processing units, and the like are realized. As functions and the processing units implemented by the processor 1001, there are an image generation processing, a display processing, and the like.

Furthermore, as described above, the controller 2 also functions as part of the eye tracking device 3. That is, as one of the functions and the processing units realized by the processor 1001, there are a viewpoint detection processing (in other words, eye tracking processing) for detecting the viewpoint of the first user U1 and the like.

The memory 1002 stores a control program 1011, setting information 1012, image data 1013, and other data and information related to a processing(s). The control program 1011 is a computer program that implements the functions and the like. The setting information 1012 is system setting information and user setting information. The image data 1013 is data for displaying images and video images on the screen 20. The communication interface device 1003 is connected to the drive circuit 70 of the transparent display panel 10, a first camera 30 configurating the eye tracking device 3, and other external devices, and the like, and performs a communication processing(s) by using a predetermined communication interface. An input device(s) and an output device(s) can be connected to the input/output interface device 1004.

[Use as Communication Tool of Transparent Display]

The transparent display 1 can be used as a communication tool between the first user U1 and the second user U2. For example, in a medical field, the first user U1 who is a patient with general paralysis and the second user U2 who is a doctor can communicate via the image displayed on the screen 20 of the transparent display panel 10.

Figure 7:
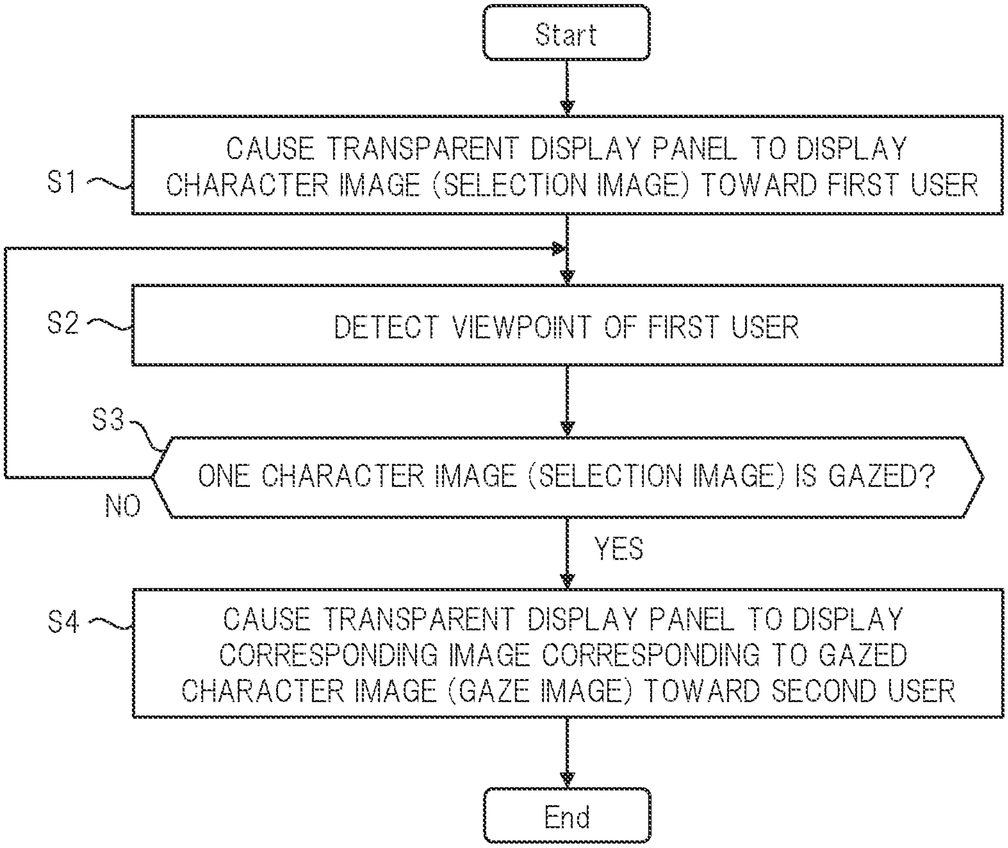
FIG. 7 is a diagram showing a flow of intention display control in the transparent display apparatus of the first embodiment.
Figure 8:
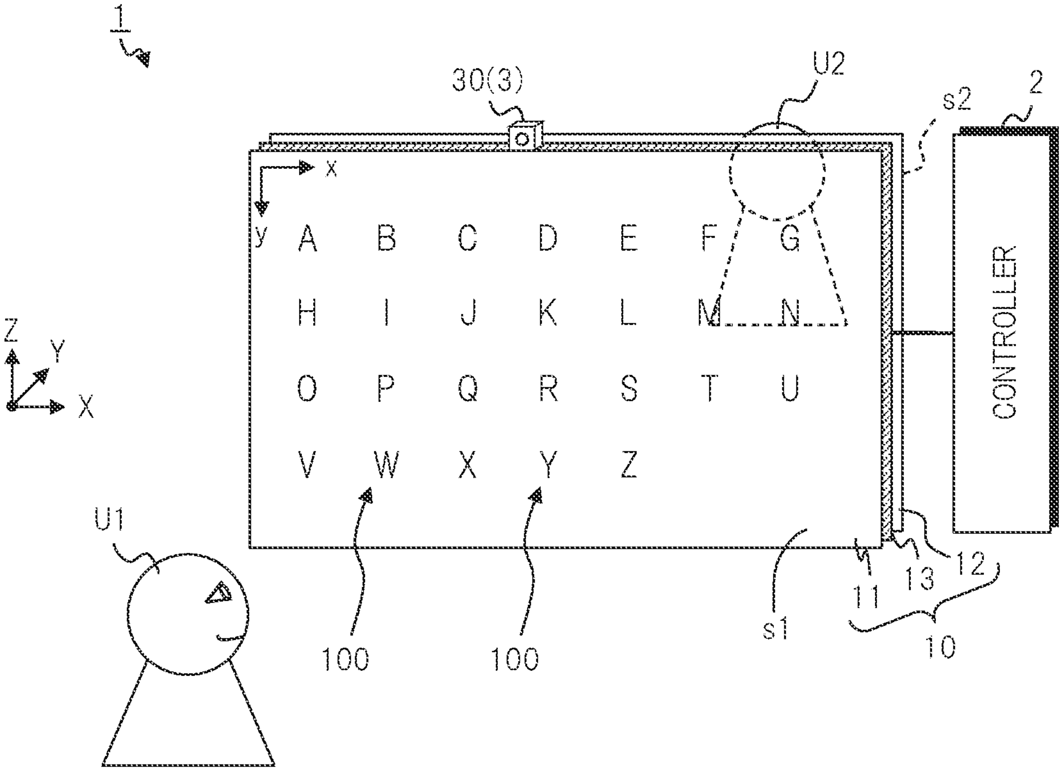
FIG. 8 is a diagram showing an example of a screen display in the first embodiment.
Figure 9:
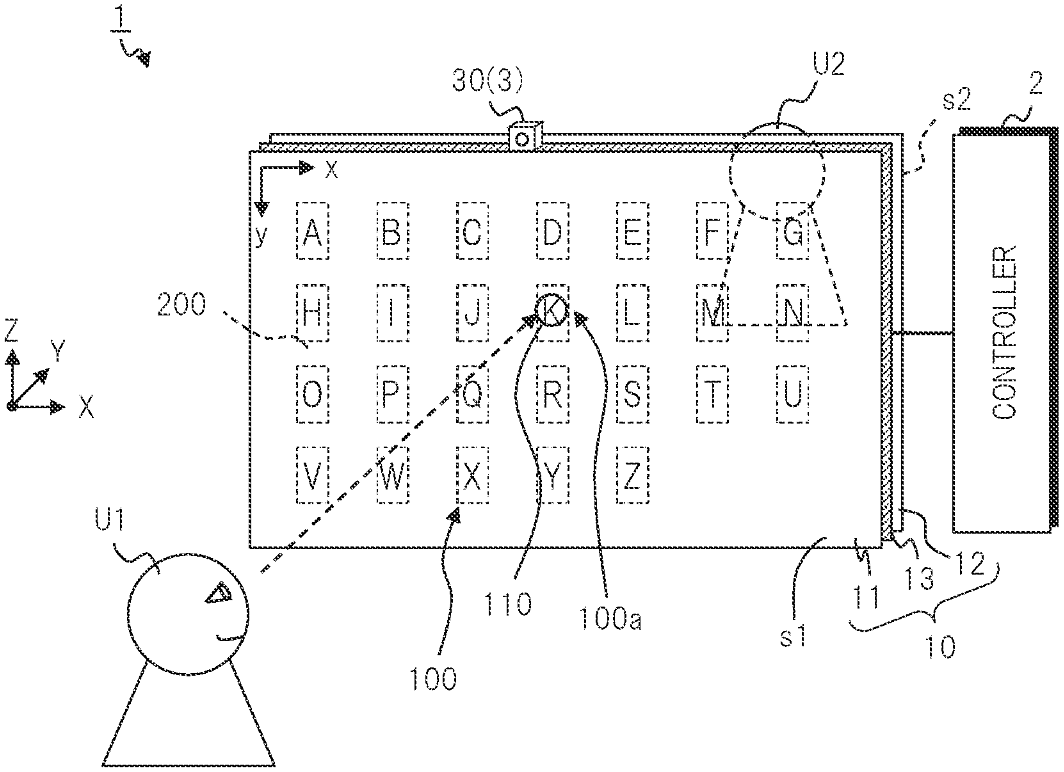
FIG. 9 is a diagram showing an example of the screen display in the first embodiment.

Hereinafter, use of the transparent display 1 as a communication tool will be described in detail with reference to FIGS. 7 to 10. FIG. 7 is a flowchart for explaining a flow of an intention communication processing in the transparent display. FIGS. 8 to 10 are diagrams for each explaining one example of an image displayed on the screen of the transparent display panel. Note that various processings on the transparent display 1 described below are executed by the controller 2 as described above.

As shown in the flowchart of FIG. 7, when power is turned on and the intention communication proceeding is started, a plurality of individually selectable selection images are displayed on the screen 20 of the transparent display panel 10 toward the first user U1 (step S1). In the first embodiment, as shown in FIG. 8, the transparent display 1 causes a plurality of character images 100 including alphabet syllabary to be displayed on the screen 20 of the transparent display panel 10, as one example of selection images. That is, the transparent display 1 displays the plurality of character images 100 with the first surface s1 side of the transparent display panel 10 by using the first surface s1 side as the front surface. Note that the selection image is not particularly limited and, besides the above-mentioned character images 100, for example, images of Japanese alphabets, various symbols, and the like may be used, for example.

In this state, the first user U1 can visually recognize each character image 100, which is the selection image displayed on the screen 20, from the first surface s1 side, and can also visually recognize the second user U1 via the screen 20 on which the character image 100 is displayed. Further, the second user U2 can visually recognize the character image 100 displayed on the screen 20 from the second surface s2 side, and can also visually recognize the first user U1 via the scree 20 on which the character image 100 is displayed. However, the character image 100 viewed from the second user U2 absolutely becomes an image viewed from the second surface s2 side of the screen 20. In other words, the character image 100 viewed from the second user U2 becomes an image in which the characters are reversed in the right-left direction, that is, becomes a so-called mirror character image.

Proceeding to step S2, the eye tracking device 3 included in the transparent display 1 detects the viewpoint of the first user U1 based on the image of the first user U1 photographed by the first camera 30, for example. That is, the eye tracking device 3 detects a destination on the screen 20 where the visual line of the first user U1 is directed (in other words, a gaze point). When the viewpoint of the first user U1 is detected, as shown in FIG. 9, a cursor (indicated as one example by a circle in the figure) is displayed. This cursor 110 moves within the screen 20 as the viewpoint of the first user U1 moves.

Proceeding to step S3, the transparent display 1 determines whether the first user U1 gazes at one of the plurality of character images 100 from the gaze point of the first user U1 detected by the eye tracking device 3. In other words, the transparent display 1 determines whether the first user U1 intends to select one of the plurality of character images 100.

When the viewpoint of the first user U1 remains on one character image 100 for a predetermined period of time (for example, about several seconds) or more (step S3: YES), the transparent display 1 whether the first user U1 gazes the character image 100. More specifically, as shown in FIG. 9, it is determined that when the viewpoint of the first user U1 remains at the character image 100 on a setting region 200 set to one character image 100 for the above-mentioned predetermined period of time or more, the first user U1 gazes at the character image 100. Note that the character image (also referred to as a selection image) 100 determined to be gazed at by the first user U1 in this manner is also referred to as a "gaze image".

In other words, when the cursor 110 displayed on the screen 20 moves in the setting region 200 set correspondingly to one character image 100 and a time remaining in the setting region 200 is for the above-mentioned predetermined period of time or more (Step S3: YES), the transparent display 1 determines that the first user U1 has selected the character image 100. For example, when a time during which the cursor 110 displayed on the screen 20 overlaps the one setting region 200 becomes the above-mentioned predetermined period of time or more, the transparent display 1 determines that the character image 100 has been selected by the first user U1. For example, as shown in FIG. 9, when a state in which the cursor 110 overlap the setting region 200 corresponding to a character image 100*a* of "K" on the screen 20 of the transparent display panel 10 continues for the above-mentioned predetermined period of time or more, it is determined that the character image 100*a* of "K" has been selected by the first user U1.

In this example, the setting region 200 corresponding to each character image 100 is set within a range of such a degree that each character image 100 is included. However, the setting region 200 may be set within any range, and may be set as a region including the pixels that do not form the character image 100. The setting region 200 corresponding to each character image 100 may be set within a wider range than a range of displaying each character image 100. Note that illustration of the setting region 200 is omitted except in FIG. 9.

In this example, the plurality of character images 100 are intended to be displayed within a relatively wide range on the screen 20 of the transparent display panel 10. Consequently, an interval between the respective character images 100 can be relatively wide, and the setting region 200 corresponding to each character image 100 can be set in a relatively wide range. This makes it easier to improve detection accuracy of the character image 100 that the first user U1 intends to select. Of course, the plurality of character images 100 may be displayed in a relatively narrow range on the screen 20. In this case, there is an advantage that the first user U1 and the second user U2 can easily visually recognize facial expressions of the other person via the transparent display panel 10.

Note that instead of setting the setting region 200, for example, the respective character images 100 of a predetermined character size may respectively be arranged at a setting position coordinate that is individually set within the screen 20. In this case, the transparent display 1 may determine which character image 100 the first user U1 intends to select, for example, based on the setting position coordinate of each character image 100 and the position coordinate of the cursor 110.

As described above, in step S3, if it is determined that the first user U1 is gazing at one of the character images 100, for example, the character image 100*a* of "K" (step S3: YES), the processing proceeds to step S4. In step S4, the transparent display 1 displays a corresponding image corresponding to the character image 100*a*, which is the gaze image, to the second user U2 on the opposite side of the screen 20.

Here, the "corresponding image" refers to an image obtained by appropriately changing the display state of the character image 100*a*, which is the gaze image, and "displaying the corresponding image to the second user U2" means to display the corresponding image so that the second user U2 easier visually recognize it than the first user U1. In other words, "displaying the corresponding image to the second user U2" means to display, on the screen 20, an image (corresponding image) changed so that the second user U2 easily visually recognizes the display state of the character image 100*a* which is the gaze image.

As described above, when determining that the character image 100*a* of "K" is gazed at by the first user U1, the transparent display 1 displays the corresponding image 120 corresponding to the character image 100*a* of "K" to the second user U2. That is, the corresponding image 120 changed so that the second user U2 easily visually recognizes the display state of the character image 100*a* of for "K" is displayed on the screen 20. As shown in FIG. 10, the transparent display 1 changes the display state of the character image 100*a* of "K" as one example of the corresponding image 120, enlarges it more than the other character images 100, and further causes the screen 20 of the transparent display 10 to display an image obtained by reversing the character image 100*a* in the right-left direction.

Figure 10A:
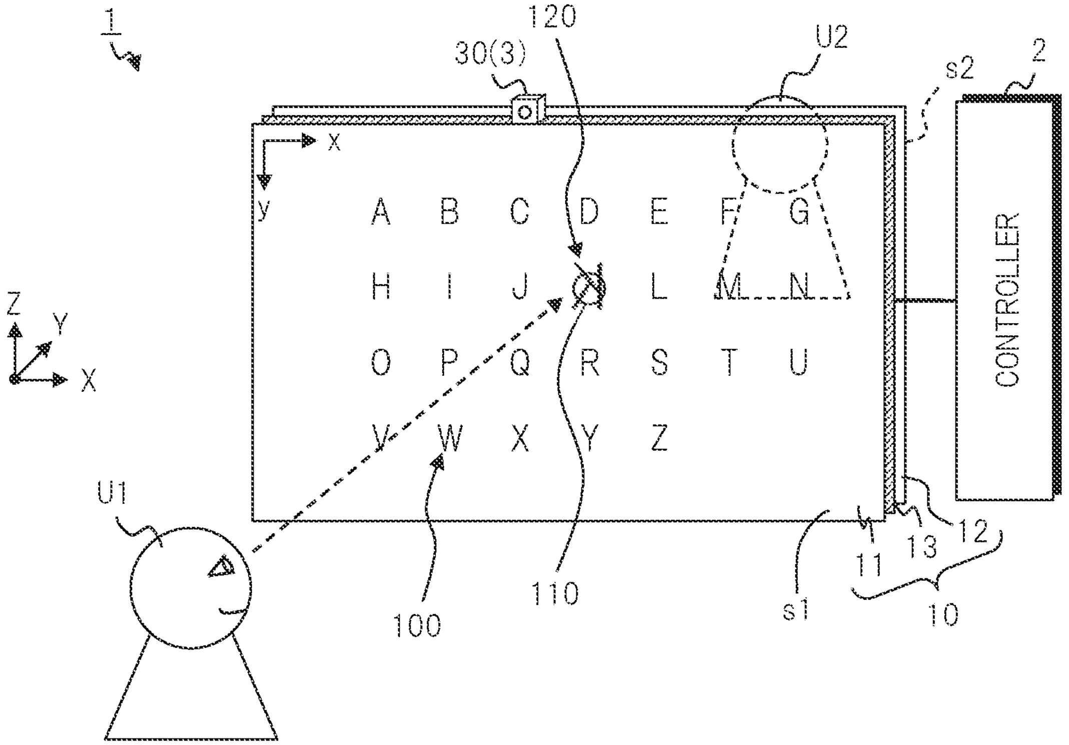
FIG. 10A is a diagram showing an example of the screen display in the first embodiment.
Figure 10B:
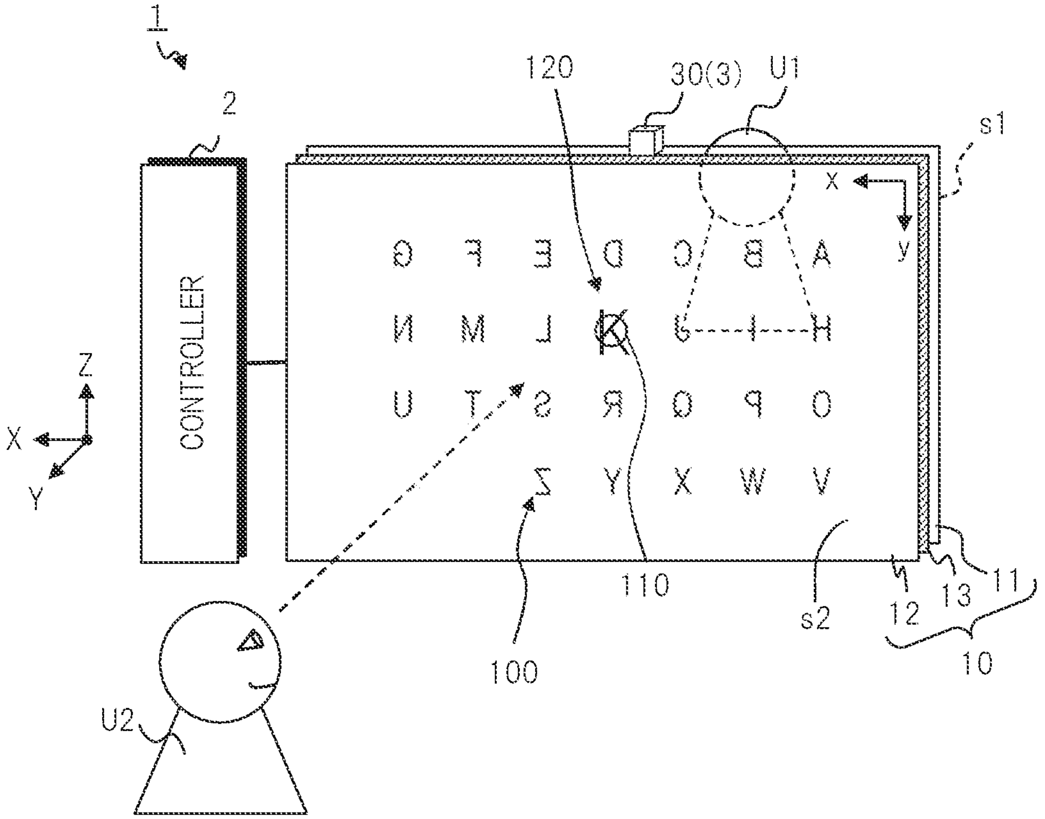
FIG. 10B is a diagram showing an example of the screen display in the first embodiment.

As shown in FIG. 10A, for the first user U1, the other character images 100 except for the corresponding image 120 (100*a*) are displayed on the screen 20 in a correct direction, but only the corresponding image corresponding to the character image 100*a* of "K" is displayed on the screen 20 as a so-called mirror character. For the second user U2, as shown in FIG. 100B, only the corresponding image 120 corresponding to the character image 100*a* of "K" is displayed on the screen 20 in the correct direction, and the character image 100 except for the corresponding image 120 is displayed on the screen 20 as the image reversed in the right-left direction, that is, as the image of the so-called mirror image.

Note that if it is determined in step S3 that the first user U1 is not gazing at one of the character images 100 (step S3: NO), the process returns to step S2 and continues detecting the viewpoint of the first user U1.

In this way, when one of the character images 100, which are the selection images, is gazed at by the first user U1, the transparent display 1 displays a corresponding image 120 corresponding to the gazed character image (that is, gaze image) to the second user U2. This makes it easier for the first user U1 to convey to the second user U2 that, for example, the character image of "K" has been selected. Conversely, the second user U2 can easily recognize that the first user U1 has selected the character image 100*a* of "K". The second user U2 can easily recognize words and sentences.

As described above, according to the first embodiment, it is possible to use the transparent display 1 in a new way, and it becomes easier to communicate between the first user U1 and the second user U2. The first user U1 and the second user U2 can communicate while looking at mutual expression face-to-face, which facilitates the communication. As described above, according to the present invention, it is possible to provide a technique that can expand use application of the transparent display apparatus that is the transparent display 1.

Note that the transparent display 1 may include a speaker, a voice synthesis system, and the like. In that case, for example, when the first user U1 gazes at one of the character images 100, which is the selection image, on the screen 20 of the transparent display panel 10, the transparent display 1 converts character information corresponding to the character image 100 to audio, and can output it from the speaker. Thus, the second user U2 can communicate with the first user U1 while listening to the audio altogether with the character images on the screen 20.

Furthermore, in the above example, when the transparent display 1 determines that the first user U1 is gazing at one character image 100 for a predetermined period of time or more, it displays the corresponding image 120 to the second user U2. However, timing at which the transparent display 1 displays the corresponding image 120 to the second user U2 is not limited to this. For example, apart from the plurality of character images 100, for example, a "confirm button" image for confirming the selection of the character image 100 is displayed on the screen 20. Then, after determining that the first user U1 is gazing at one character image 100 for a predetermined period of time or more, when the first user U1 further gazes at and selects the "confirm button" image, the transparent display 1 may display the corresponding image 120 to the second user U2.

Modification Example of First Embodiment

In the above example, explained has been an example in which the transparent display 1 changes, as the corresponding image 120 corresponding to the gaze image, the display state of the character image 100*a* to enlarge it more than the other character images 100, and causes the screen 20 of the transparent display panel 10 to display the character image 100*a* reversed in the right-left direction. However, the corresponding image 120 is not limited to such an image.

Figure 11:
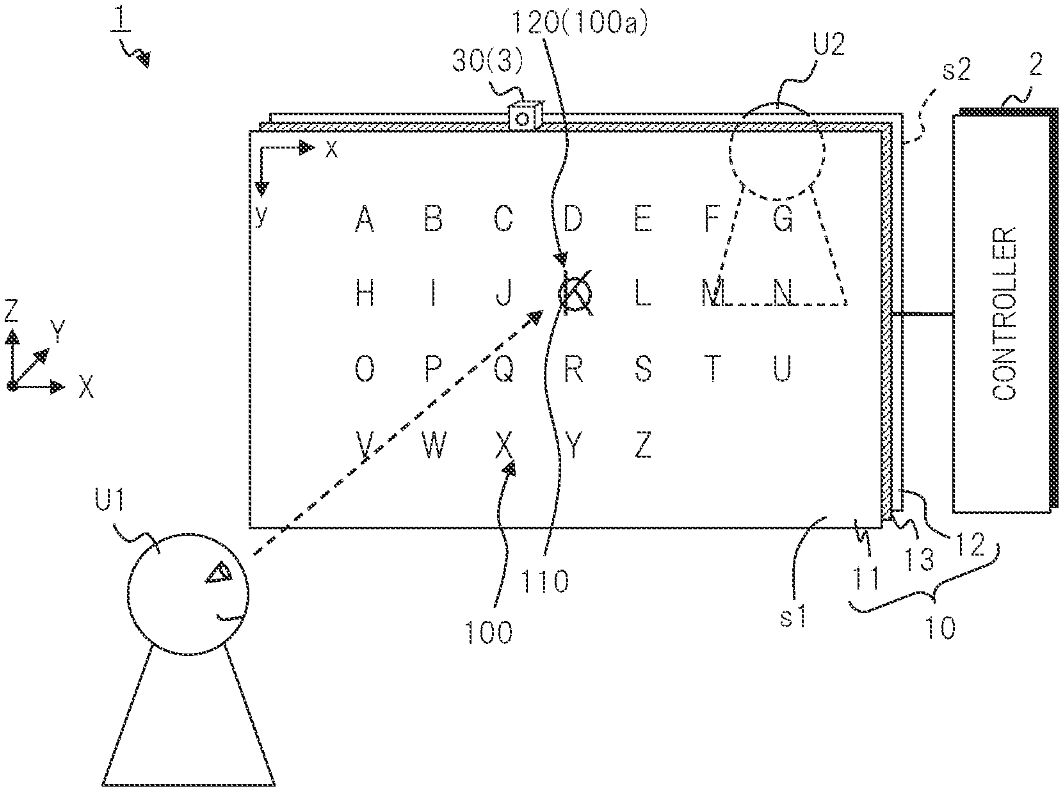
FIG. 11 is a diagram showing a screen display in a modification example of the first embodiment.
Figure 12:
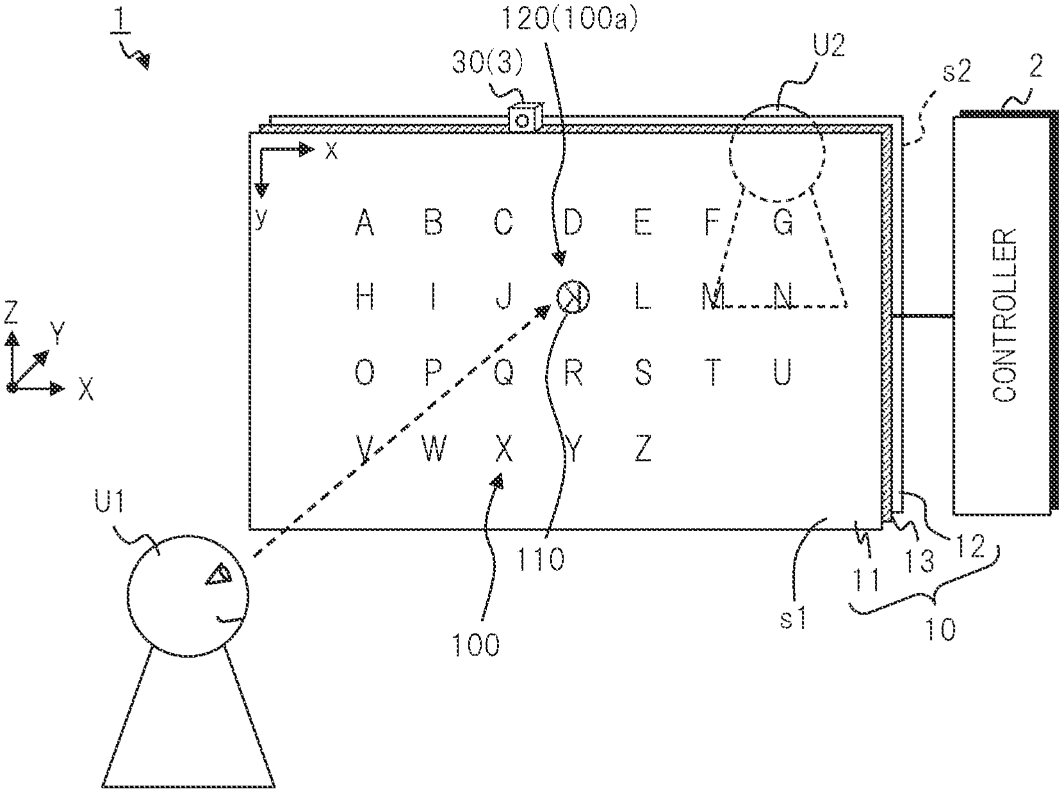
FIG. 12 is a diagram showing the screen display in the modification example of the first embodiment.

For example, as shown in FIG. 11, the corresponding image 120 may be an image in which the display state of changing the character image 100*a* to enlarge the character image 100*a* more than the other character images 100. For example, as shown in FIG. 12, the corresponding image 120 may also be an image obtained by reversing the character image 100*a* in the right-left direction without enlarging the character image 100*a*. Furthermore, the corresponding image 120 may be, for example, a discolored image obtained by changing display color of the character image 100*a* as the gaze image. Even if the corresponding image 120 is such an image, the second user U2 can easily visually recognize the gaze image that the first user U1 gazes at.

Further, the corresponding image 120 does not have to be an image obtained by changing the position of the character image 100*a*, which is the gaze image, at its position. The corresponding image 120 may be an image obtained by causing a second region 220 different from the first region 210 in the screen 20 to display the character image 100*a* which is the gaze image.

Figure 13A:
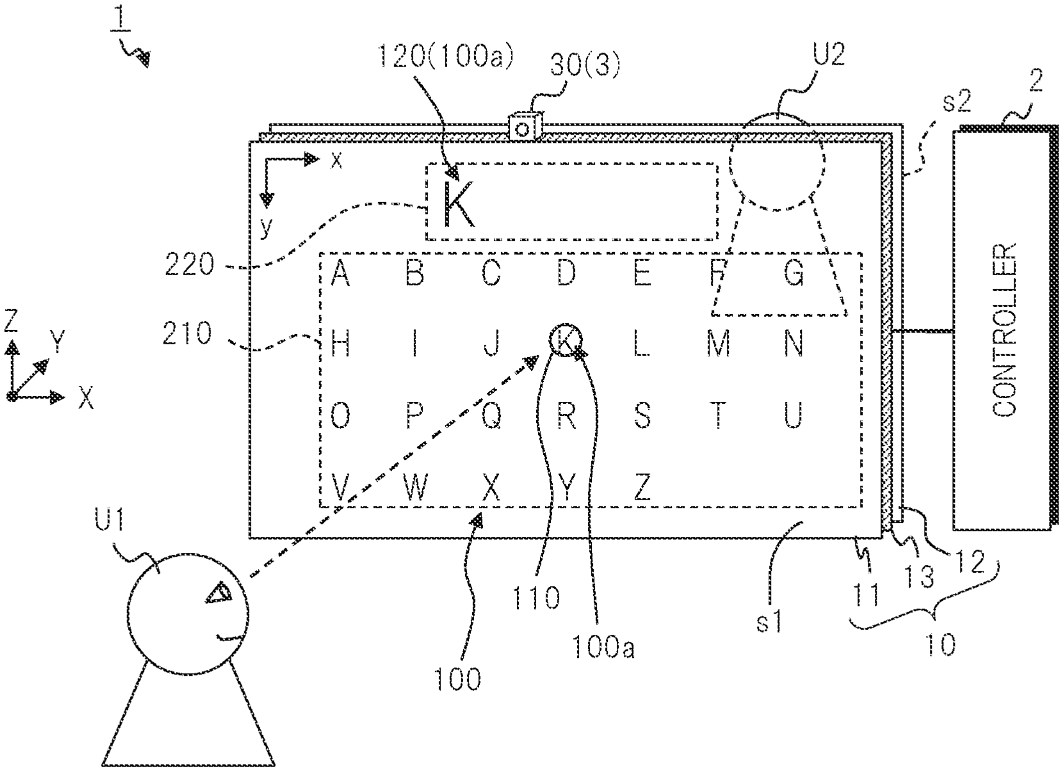
FIG. 13A is a diagram showing the screen display in the modification example of the first embodiment.
Figure 13B:
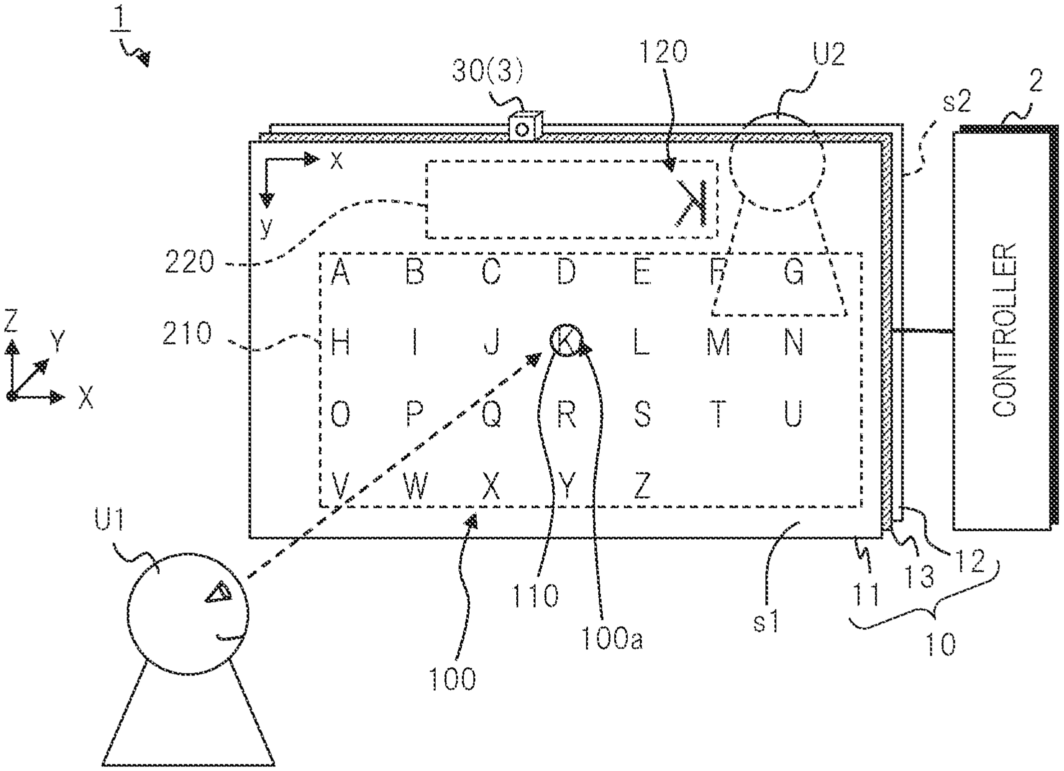
FIG. 13B is a diagram showing the screen display in the modification example of the first embodiment.

For example, when the first user U1 gazes at the character image 100*a* of "K", as shown in FIG. 13A, the transparent display 1 may cause the second region 220 as the corresponding image 120 to display the character image 100*a* of "K". Furthermore, as shown in FIG. 13B, the transparent display 1 may cause the second region 220 to display an image obtained by reversing, as the corresponding image 120 corresponding to the character image 100*a*, the character image 100*a* of "K" in the right-left direction. In any case, by displaying the corresponding image 120 in the second region 220 different from the first region 210 in the screen 20, the second user U2 can more easily visually recognize the character image selected by the first user U1 from the viewpoint.

Figure 14:
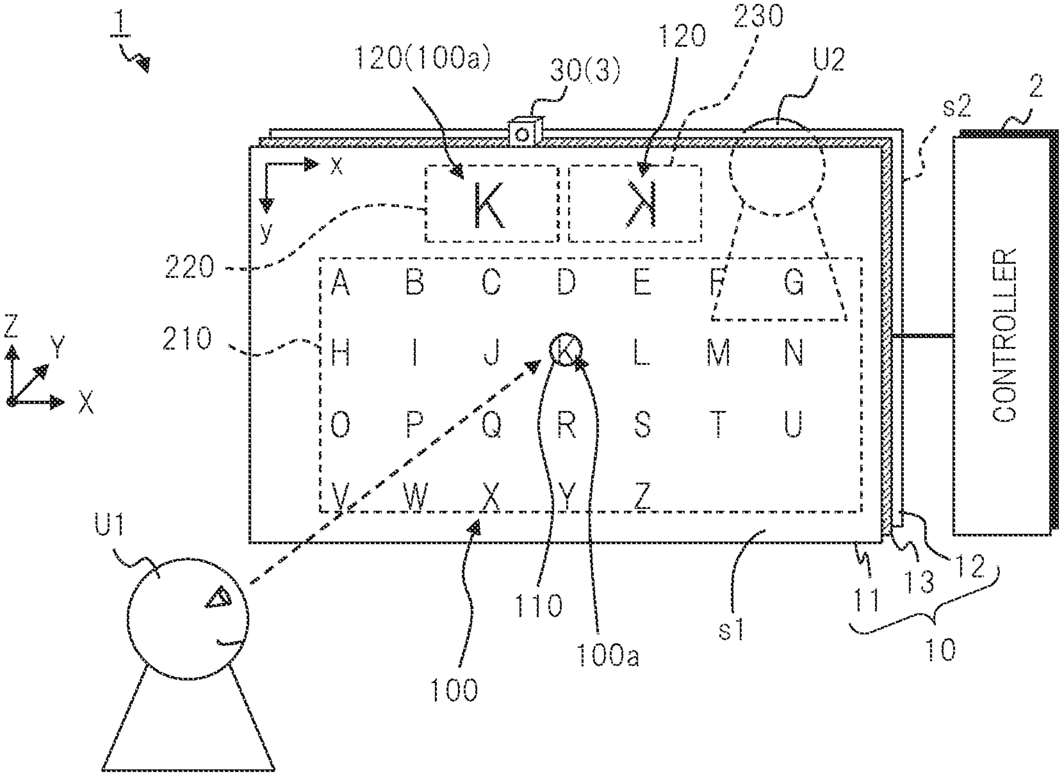
FIG. 14 is a diagram showing the screen display in the modification example of the first embodiment.

Furthermore, for example, as shown in FIG. 14, a second region 220 and a third region 230 that are different from the first region 210 are provided in the screen 20, and the corresponding image 120 may be displayed in each of the second region 220 and the third region 230. In the example of FIG. 14, the character image 100*a* of "K" is displayed in the second region 220 as the corresponding image 120, and the image obtained by reversing the character image 100*a* of "K" in the right-left direction is displayed in the third region 230 as the corresponding image 120.

Figure 15:
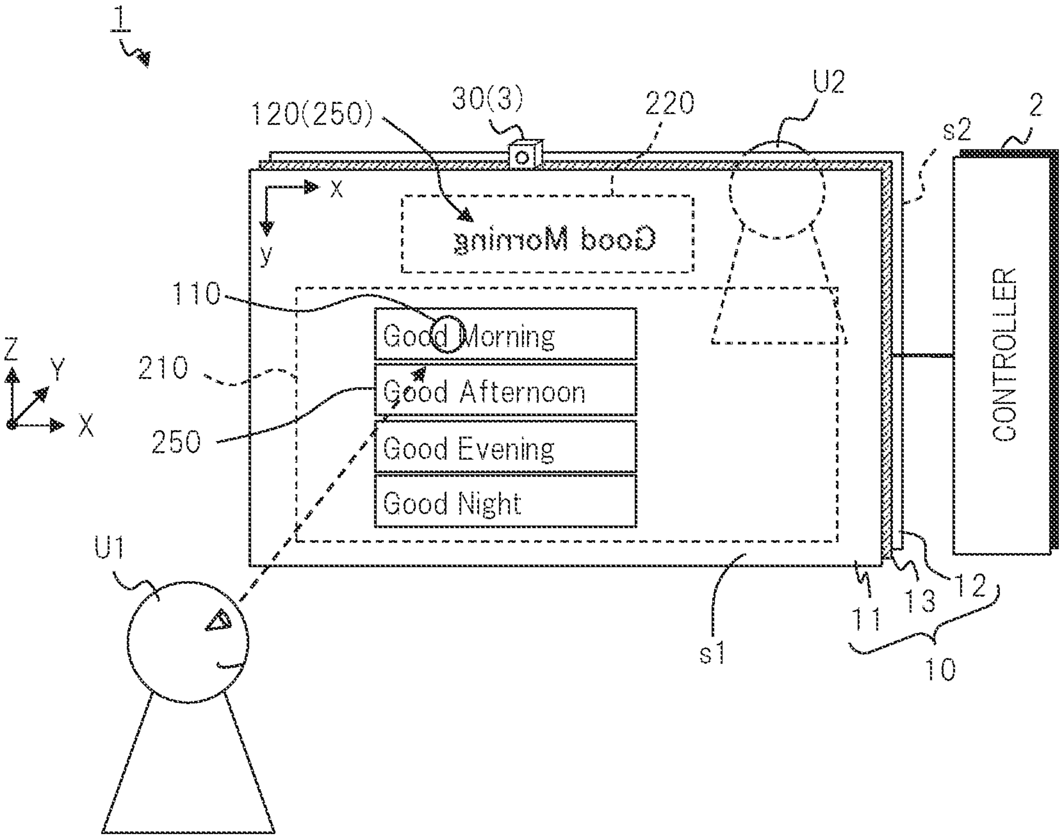
FIG. 15 is a diagram showing the screen display in the modification example of the first embodiment.

Furthermore, in the first embodiment, the transparent display 1 displays the plurality of character images 100 as selection images on the screen 20 of the transparent display panel 10, but the selection images are not limited to the character images 100. For example, as shown in FIG. 15, the selection image may be a registration image 250 configured by the plurality of character images 100 registered in advance. In the example of FIG. 15, an image obtained by reversing the registration image 250 of "Good morning" is displayed in the second region 220 as the corresponding image 120. Consequently, the first user U1 can communicate with the second user U2 by reducing the number of gazes, which improves convenience. Note that as the registration image 250, for example, a predetermined word, a fixed sentence, and the like is recited. Of course, the first user U1 can also register images of frequently used words, sentences, and the like. Furthermore, the corresponding image 120 may be an image obtained by enlarging and the like the registration image 250, which is the selection image, in the first region 210.

Second Embodiment

A transparent display of a second embodiment will be explained by using FIGS. 16 to 20. A basic configuration of the transparent display of the second embodiment is the same as and common to the first embodiment and, hereinafter, components of the transparent display of the second embodiment, which are different from the first embodiment will be mainly explained.

Figure 16:
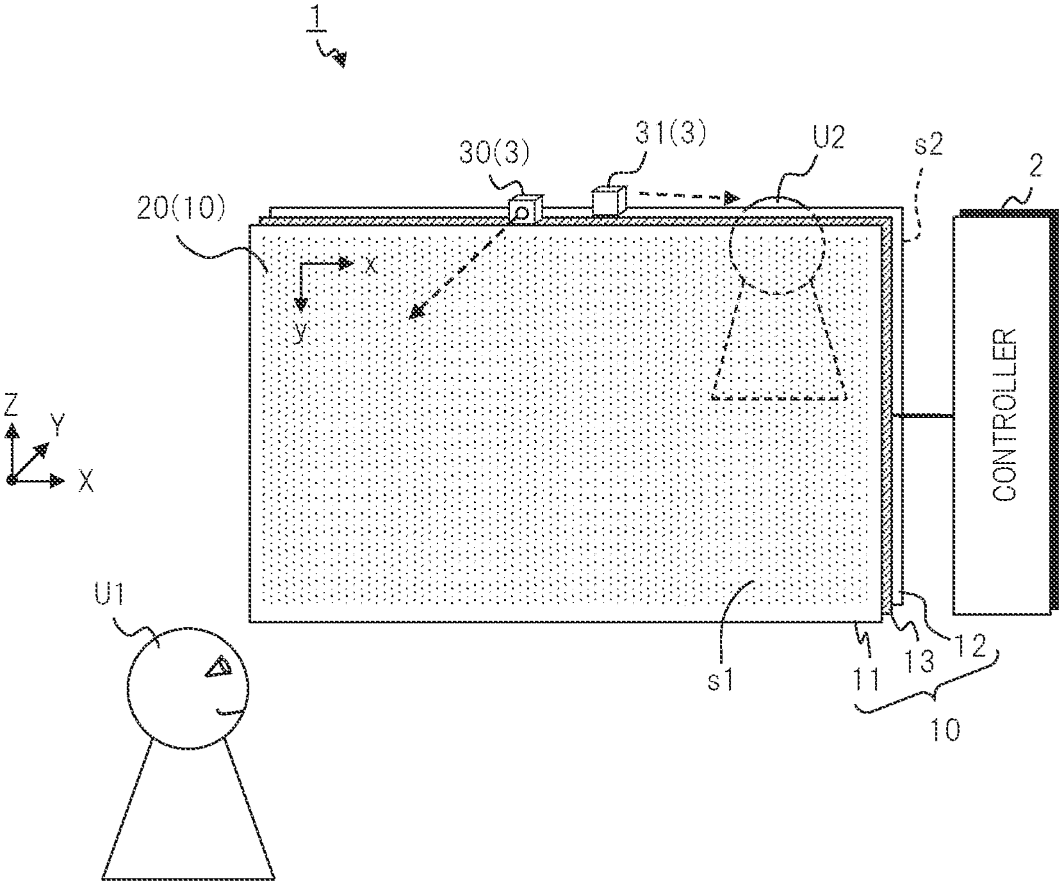
FIG. 16 is a diagram showing a configuration of a transparent display apparatus according to a second embodiment.
Figure 17:
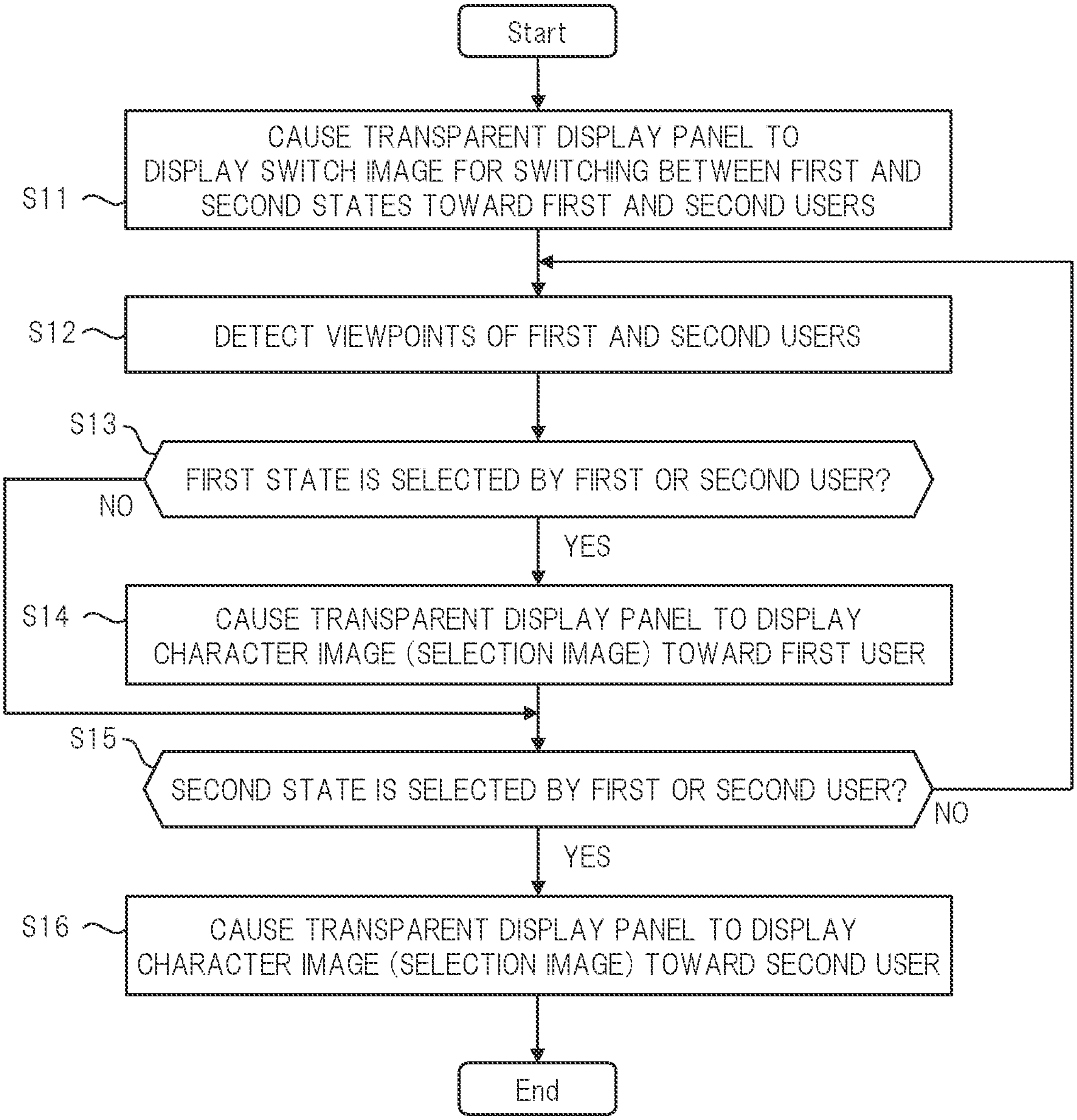
FIG. 17 is a diagram showing a flow of switching control in the transparent display apparatus of the second embodiment.
Figure 18A:
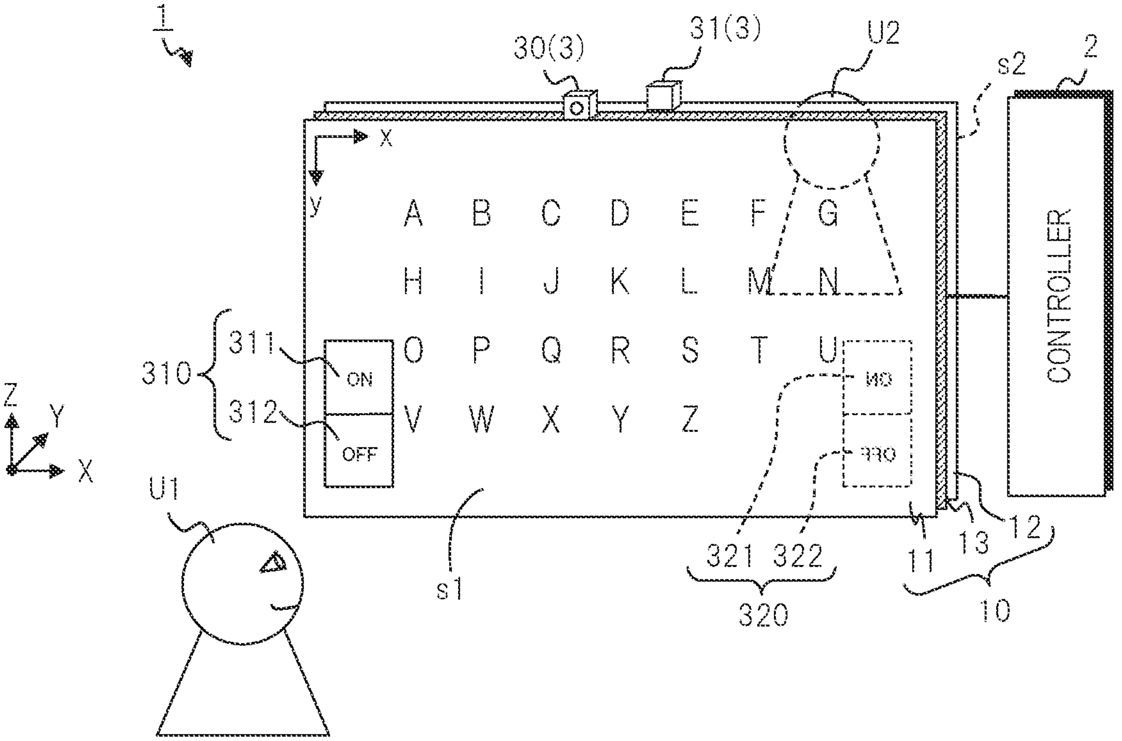
FIG. 18A is a diagram showing an example of a screen display in the second embodiment.
Figure 18B:
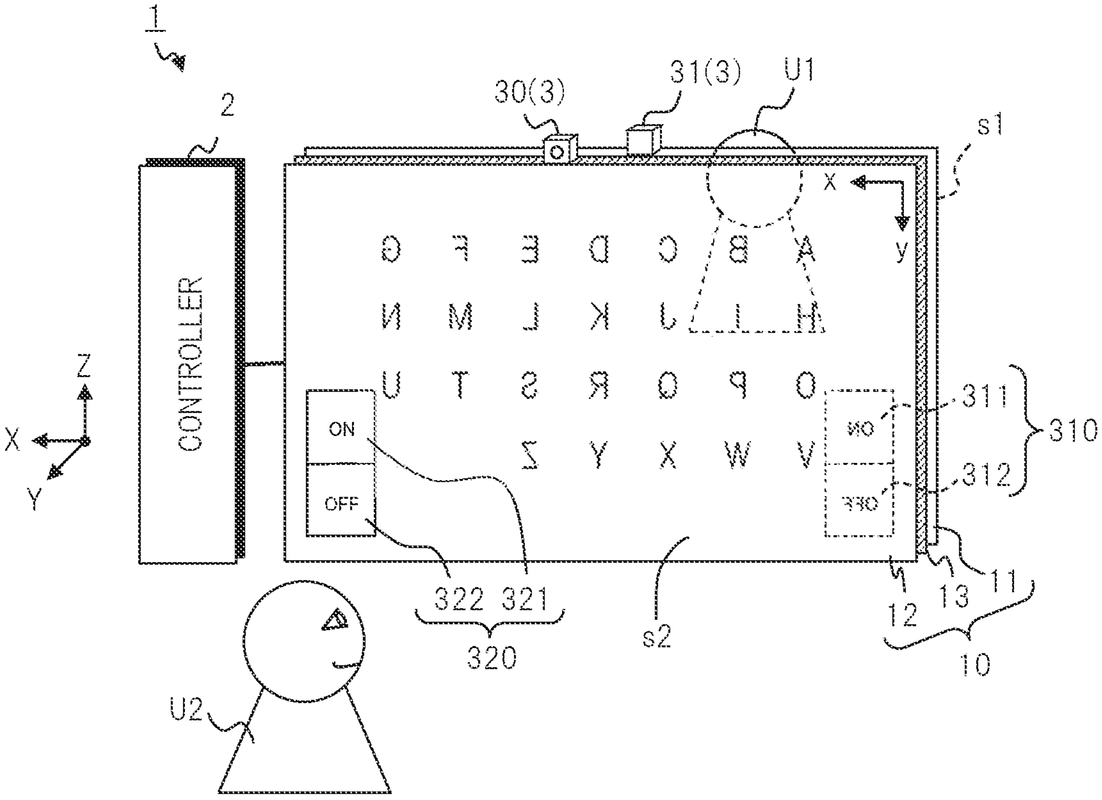
FIG. 18B is a diagram showing an example of the screen display in the second embodiment.
Figure 19A:
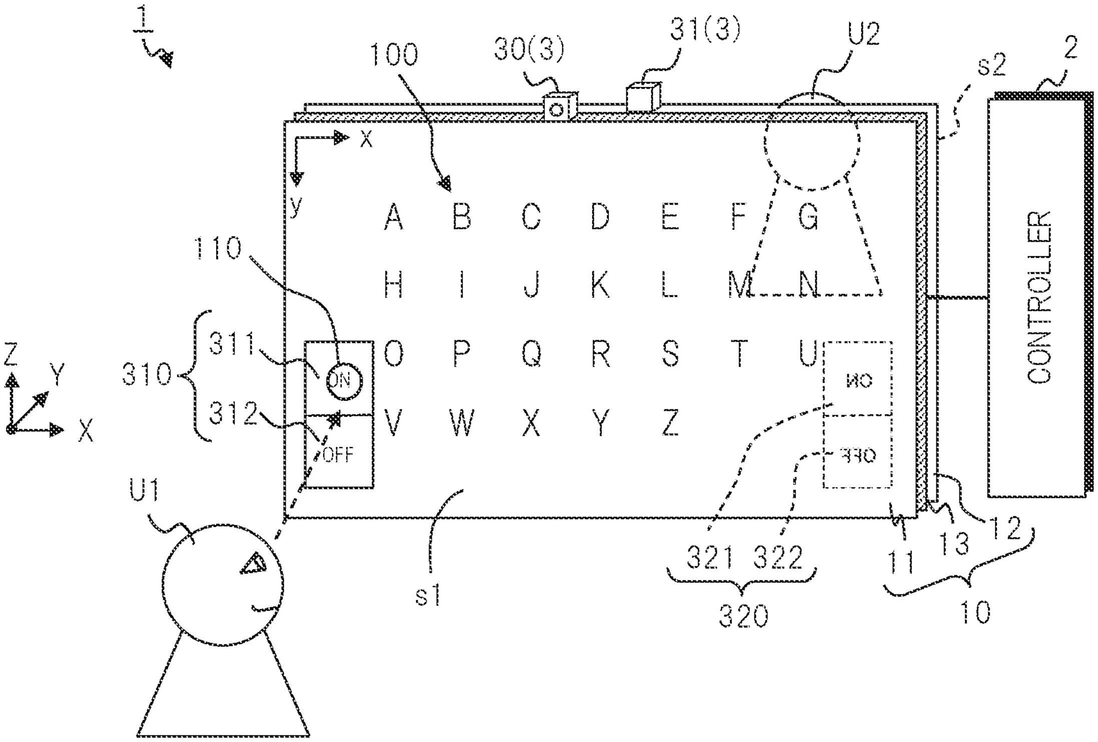
FIG. 19A is a diagram showing an example of the screen display in the second embodiment.
Figure 19B:
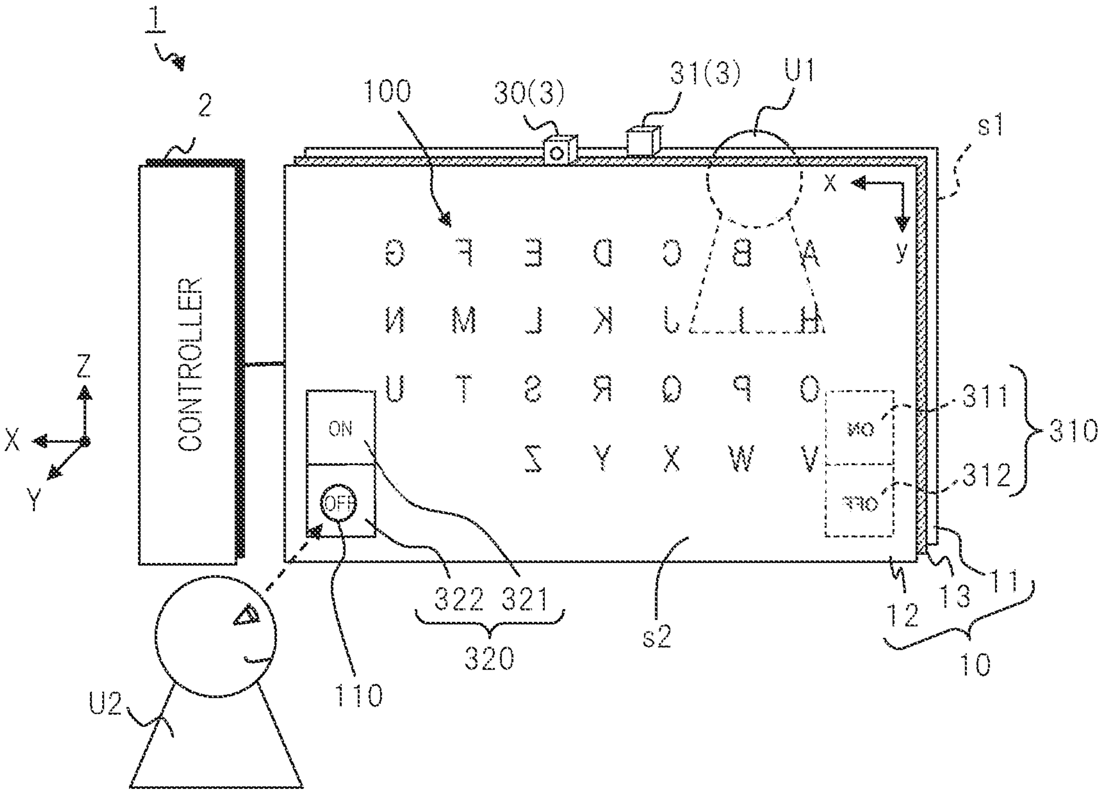
FIG. 19B is a diagram showing an example of the screen display in the second embodiment.
Figure 20A:
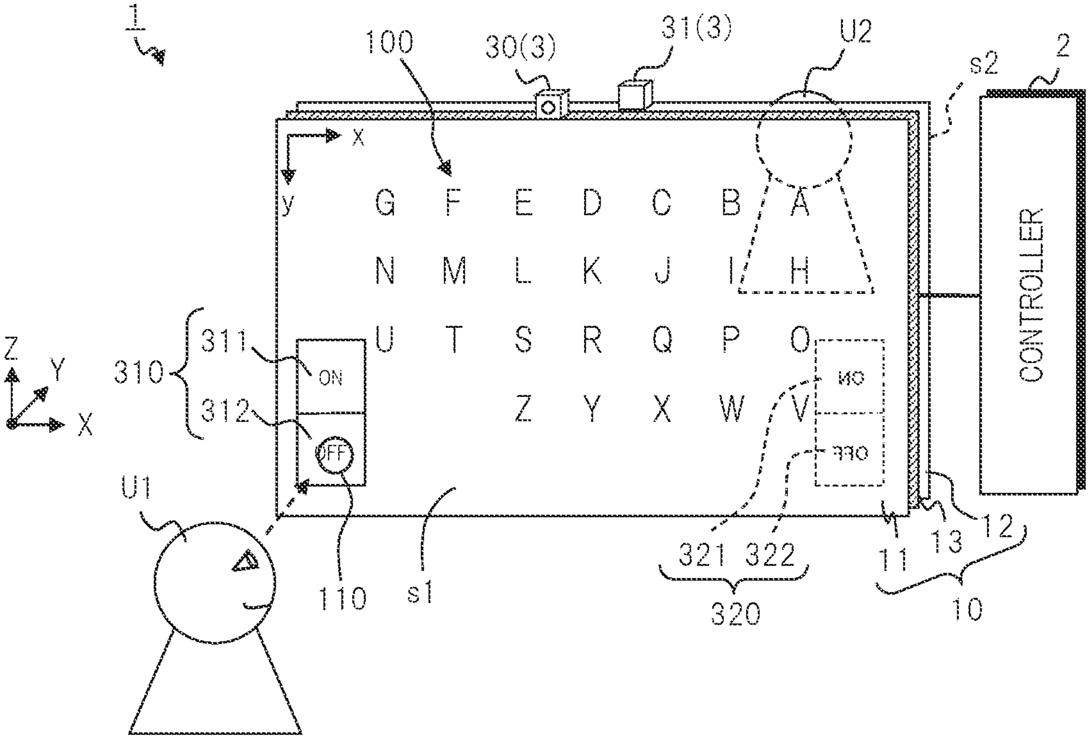
FIG. 20A is a diagram showing an example of the screen display in the second embodiment.
Figure 20B:
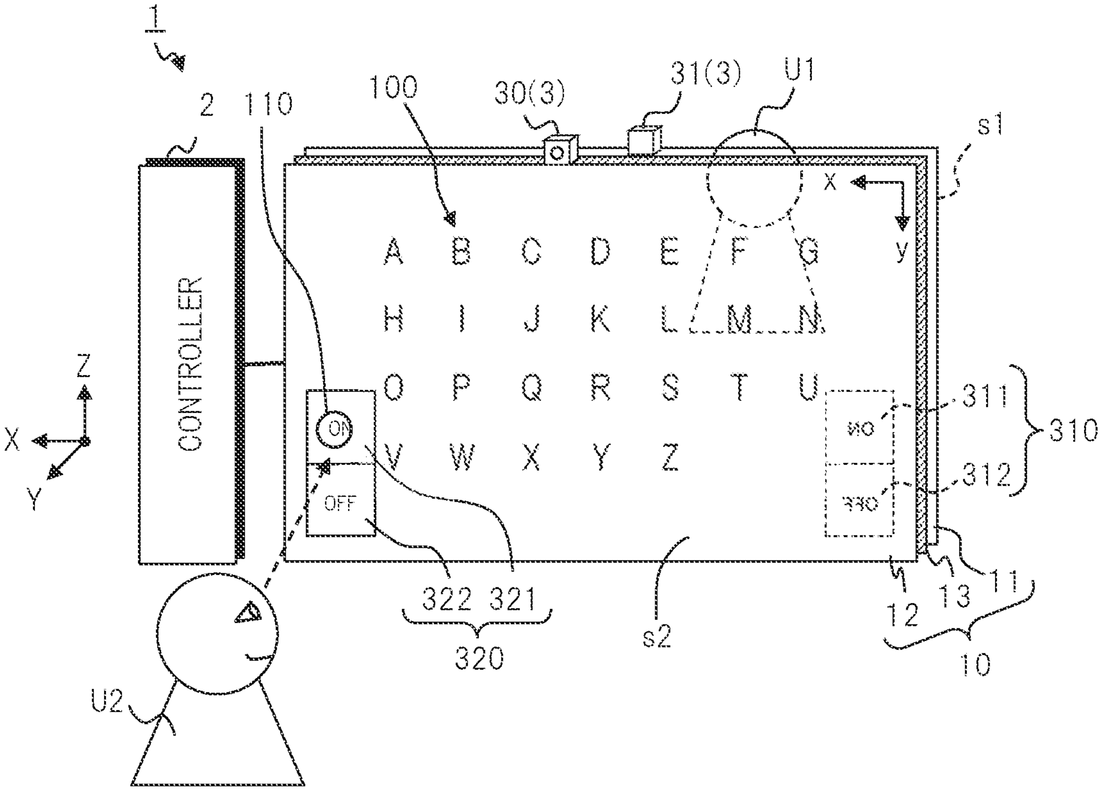
FIG. 20B is a diagram showing an example of the screen display in the second embodiment.

FIG. 16 is a perspective view showing a schematic configuration of the transparent display according to the second embodiment. FIG. 17 is a flowchart for explaining a flow of switching control for switching between a first state and a second state in the transparent display according to the second embodiment. FIGS. 18 to 20 are diagrams each showing one example of an image displayed on the screen of the transparent display panel according to the second embodiment. In FIGS. 18 to 20, FIGS. 18A, 19A, and 20A are diagrams of the screen of the transparent display panel viewed from the first user side, and FIGS. 18B, 19B, and 20B are diagrams of the screen of the transparent display viewed from the second user side.

As shown in FIG. 16, in the second embodiment, the eye tracking device 3 configuring the transparent display 1 includes the first camera 30 as in the first embodiment, and further includes a second camera for detecting (In other words, measuring) the viewpoint of the second user U2. The second camera 31 is installed, for example, on an upper portion of the transparent display panel 10 toward the second surface s2 side of the screen 20, and photographs movements of eyes (in particular, movement of pupils) of the second user U2.

Similarly to the first camera 30, an installation location of the second camera 31 is not particularly limited as long as it is a location where the movements of the eyes of the second user U2 can be photographed, and it does not necessarily have to be on the transparent display panel 10. Further, in this example, the second camera 31 is a CCD camera or the like in this example, but is not limited to this, and may be any camera that can photograph the eye movements of the second user U2. In this example, the second camera 31 is a CCD camera or the like, but is not limited to this and may be any member as long as the member can photograph the movements of the eyes of the second user U2. Moreover, in this example, the second camera 31 transmits the photographed image to the controller 2, and the controller 2 performs an image processing based on the photographed image (in other words, camera image), thereby detecting the viewpoint of the user U2.

The transparent display 1 of the first embodiment described above is used, for example, in a medical field for communication between the first user U1 who is a patient with general paralysis and the second user U2 who is a doctor. The transparent display 1 of the second embodiment can also be used, for example, for communication between the first user U1 who is a patient with general paralysis and the second user U2 who is a patient with general paralysis. That is, the transparent display 1 of the second embodiment can also be used, for example, for communication between patients suffering from general paralysis. In the transparent display 1 of the first embodiment, by the image displayed on the screen 20, his or her intention can be conveyed only to the second user U2 from the first user U1. In the transparent display 1 according to the second embodiment, by the image displayed on the screen 20, the intention can be conveyed in both directions between the first user U1 and the second user U2.

The transparent display 1 of the second embodiment can switch between a first state, in which a character image of "alphabet" as the selection image (corresponding to first selection image) is displayed toward the first user U1, and a second state in which a character image as the selection image (corresponding to second selection image) is displayed toward the second user U2 according to a request from the first user U1 or the second user U2.

As shown in the flowchart of FIG. 17, when power is turned on, the transparent display 1 first causes the screen 20 to display a switch image for switching between the first state and the second state (step S11). As one example, the transparent display 1 causes the screen 20 of the transparent display panel 10 to displays a first switch image 310 and a second switch image 320 as the switch image, as shown in FIG. 18. The first switch image 310 is displayed toward the first user U1, as shown in FIG. 18A, and the second switch image 320 is displayed toward the second user U2, as shown in FIG. 18B. The first switch image 310 includes an "ON" image 311 and an "OFF" image 312, and the second switch image 320 includes an "ON" image 321 and an "OFF" image 322.

In this state, the transparent display 1 detects the viewpoints of the first user U1 and the second user U2 by using the eye tracking device 3 including the first camera 30 and the second camera 31 (step S12). Next, the transparent display 1 determines which of the first state and the second state is selected based on detection result(s). That is, the transparent display 1 determines whether the first state or the second state is requested by the first user U1 or the second user U2. First, in step S13, for example, it is determined whether the first user U1 or the second user U2 has selected the first state.

As shown in FIG. 19A, when the "ON" image 311 of the first switch image 310 is gazed at by the first user U1 and the gaze time reaches a predetermined time, the transparent display 1 determines that the first user U1 has selected the first state (step S13: YES). Alternatively, as shown in FIG. 19B, when the second user U2 gazes at the "OFF" image 322 of the second switch image 320 and the gaze time reaches a predetermined time, the transparent display 1 determines that the second user 2 has selected the first state (step S13: YES).

In this case, the process proceeds to step S14, the transparent display 1 sets the display of the transparent display panel 10 to the first state, and as shown in FIG. 19, causes the screen 20 of the transparent display panel 10 to display the plurality of character images 100, which are the selection images (corresponding to the first selection image), toward the first user U1. That is, the screen 20 of the transparent display panel 10 is caused to display the plurality of character images 100 as the first selection images by regarding the first surface s1 side as the front surface.

In this first state, the first user U1 can visually recognize each character image 100 displayed on the screen 20 from the first surface side s1, as shown in FIG. 9A. The second user U2 can be visually recognized via the screen 20 on which the character images are displayed. As shown in FIG. 19B, the second user U2 can visually recognize the character image 100 displayed on the screen 20 from the second surface s2 side, and can also visually recognize the character image 100 displayed on the screen 20 from the first user U1 side, and can visually recognize the first user U1 via the character image 100 displayed on the screen 20. However, the character image 100 viewed from the second user U2 is absolutely an image viewed from the second surface s2 side of the screen 20. That is, the character image 100 viewed from the second user U2 becomes an image obtained by reversing the character in the right-left direction, a so-called an image of a mirror character.

Thereafter, similarly to the first embodiment, an intention communication processing based on the viewpoint of the first user U1 is started (see the flowchart and the like of FIG. 7). The transparent display 1 determines, from the detection result of the eye tracking device 3, the first selection image (corresponding to the first gaze image) which is one character image 100 gazed by the first user U1. Then, the transparent display 1 displays, to the first user U1, the corresponding image (corresponding to the second corresponding image) 120 corresponding to the character image 100 as the first gaze image.

Meanwhile, if the first user U1 or the second user U2 does not select the first state (step S13: No), the process proceeds to step S15, and whether the first user U1 or the second user U2 selects the second state is determined. As shown in FIG. 20A, when the first user U1 gazes at the "OFF" image 312 of the first switch image 310 and the gaze time reaches a predetermined time, the transparent display 1 determines that first user U1 has selected the second state (step S15: YES). Alternatively, as shown in FIG. 20B, when the second user U2 gazes at the "ON" image 321 of the second switch image 320 and the gaze time reaches the predetermined time, the transparent display 1 determines that the second user U2 has selected the second state (step S15: YES).

In this case, the process proceeds to step S16, the transparent display 1 sets the display of the transparent display panel 10 to the second state and, as shown in FIG. 20, causes the screen 20 of the transparent display panel 10 to display the plurality of character images 100, which are the selection images (corresponding to the second selection image), toward the second user U2. That is, the screen 20 of the transparent display panel 10 is caused to display the plurality of character images 100 as the second selection images by regarding the second surface s side as the front surface.

In this second state, the first user U1 can visually recognize each character image 100 displayed on the screen 20, as shown in FIG. 20A, and can visually recognize the second user U2 via the screen 20 on which the character image 100 displayed. However, the character image 100 viewed from the first user U1 is absolutely the image viewed from the first surface s1 side of the screen 20. That is, the character image 100 seen by the first user U1 becomes an image obtained by reversing the character in the right-left direction, a so-called image of mirror character. As shown in FIG. 20B, the second user U2 can visually recognize the character image 100 displayed on the screen 20 from the second surface s2 side, and also visually recognize the first user U1 via the image 20 on which the character image 100 is displayed.

Thereafter, the intention communication processing based on the viewpoint of the second user U2 is performed in the same flow as in the first embodiment. That is, the transparent display 1 determines the second selection image, which is one character image 100 gazed by the second user U2, from the detection result of the eye tracking device 3. Then, the transparent display 1 displays, to the first user U1, the corresponding image (corresponding to the second corresponding image) 120 corresponding to the character image 100 as the second gaze image.

Note that when the first user U1 gazes at the "OFF" image 312 of the first switch image 310 while the intention communication processing based on the viewpoint of the first user U1 is being performed, the display on the transparent display panel 10 is switched, for example, the first state to the second state. That is, as shown in FIG. 20, the plurality of character images 100 are displayed on the transparent display panel 10 toward the second user U2. Alternatively, in this case, the display of the transparent display panel 10 is switched in a state of displaying the first switch image 310 and the second switch image 320 for switching between the first state and the second state, as shown in FIG. 19, for example.

Further, when the second user U2 gazes at the "OFF" image 322 of the second switch image 320 while the intention communication processing based on the viewpoint of the second user U2 is being performing, the display on the transparent display panel 10 is switched, for example, from the second state to the first state. That is, as shown in FIG. 19, the plurality of character images 100 are displayed on the transparent display panel 10 toward the first user U1. Alternatively, the display of the transparent display panel 10 may be switched in a state of displaying the first switch image 310 and the second switch image 320 for switching between the first state and the second state, as shown in FIG. 18.

According to the second embodiment described above, it is possible to use the transparent display 1 in a new way, and it becomes easier to communicate between the first user U1 and the second user U2. In the transparent display 1 of the second embodiment, the intension communication between the first user U1 and the second user U2 becomes possible in both directions by using the images displayed on the screen 20. Therefore, the range of use of the transparent display 1 is expanded.

Note that in the above example, the order of performing steps S13 and S14, and the order of performing steps S15 and S16 are not particularly limited, and step S15 and step S16 may be performed first. Furthermore, in the second embodiment, described has been one example of a method for switching the display of the transparent display panel 10 between the first state and the second state according to the request from the first user U1 or the second user U2. However, this method is just one example and is not particularly limited.

Modification Example of Second Embodiment

In the second embodiment, the first user U1 and the second user U2 use the eye tracking device 3 as an input means for performing various inputs and selections, but the input means is not limited to this. As the input means, for example, an input device such as a physically operated switch (so-called physical switch) or a keyboard may be used in combination with the eye tracking device 3. If the hands and fingers of the first user U1 and the second user U2 move to some extent, the operability can be further improved by using the physical switch or the like.

Figure 21:
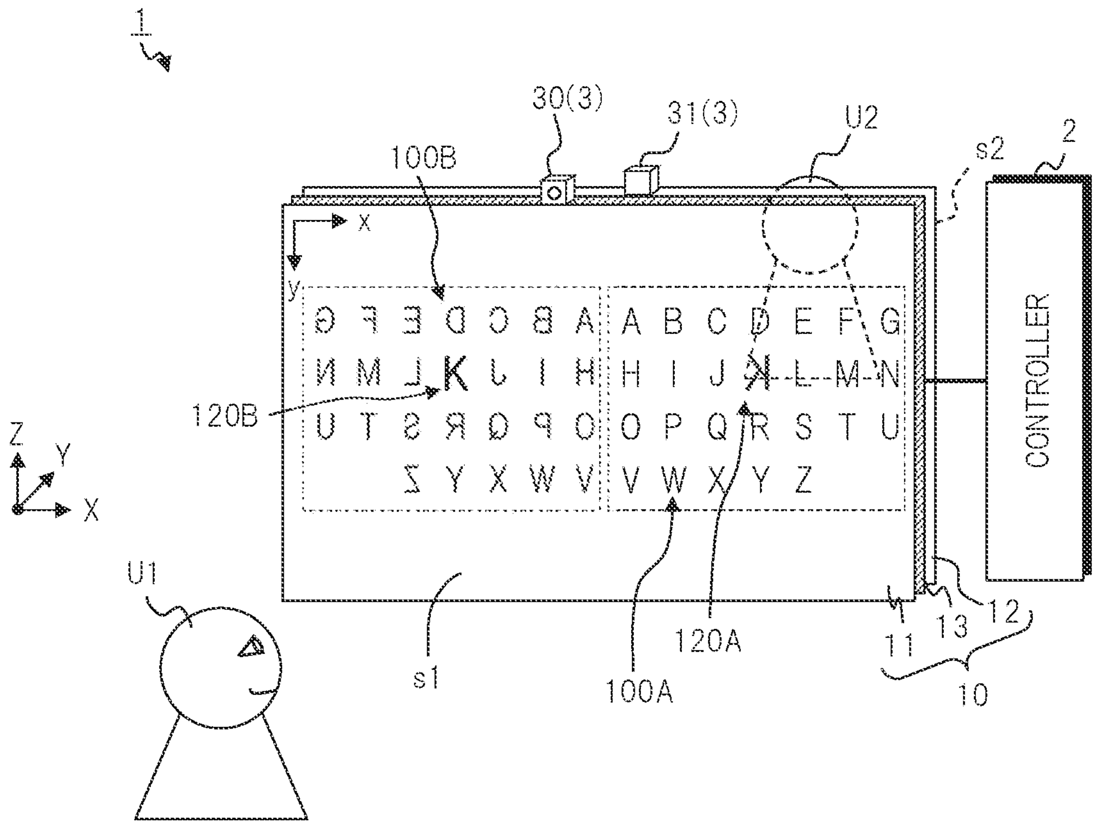
FIG. 21 is a diagram showing a screen display in a modification example of the second embodiment.

Furthermore, in the second embodiment, according to the request from the first user U1 or the second user U2, the first state in which the first user U1 can select the selection image, and the second state in which the second user U2 can select the selection image are switched, but it is not necessary to switch between the first state and the second state. That is, the first user U1 and the second user U2 may be able to select the selection image at the same time. Specifically, as shown in FIG. 21, as the selection image, the plurality of character images 100A that are the first selection images toward the first user U1, and the plurality of character images that are the second selection images toward the second user U2 may be displayed on the screen 20 which is the display region.

In this case, the transparent display 1 determines, from the detection result of the eye tracking device 3, the first selection image (that is, the first gaze image), which is one character image 100A gazed by the first user U1. Then, the transparent display 1 displays the first corresponding image 120A based on the character image 100A, which is the first gaze image, to the second user U2. Meanwhile, the transparent display 1 determines, from the detection result of the eye tracking device 3, the second selection image (that is, the second gaze image) which is one character image 100B gazed by the second user U2. Then, the transparent display 1 displays the second corresponding image 120B based on the character image 100B, which is the second gaze image, to the first user U1. By allowing the first user U1 and the second user U2 to select the selection image at the same time in this way, the convenience can be further improved.

Other Embodiment

Although the embodiments of the present invention have been specifically described above, the present invention is not limited to the above-described embodiments and can be modified in various ways without departing from the scope thereof. In each embodiment, components can be added, deleted, replaced, and the like except for essential components. Unless specifically limited, each component may be singular or plural. The present invention also includes a form obtained by combinations of the respective embodiments and their modification examples.

In the above-described embodiment, a liquid crystal display, which is a liquid crystal display device, has been described as one example of the transparent display apparatus of the present invention, but the present invention can also be applied to other self-luminous display devices such as an organic EL device. The functions described in the embodiments are similarly applicable to any display device including the display layer (pixels) that can transition between the transparent state and the non-transparent state. Further, the size of the screen of the display device is applicable from a small type to a large type without particular limitation.

Further, in the above-described embodiment, the example in which characteristic control is performed by the controller has been explained as the transparent display apparatus of the present invention, but the configuration of the transparent display apparatus of the present invention is not limited to this and the computer system externally connected to the controller of the transparent display apparatus may perform the similar characteristic control.

What is claimed is:

1. A transparent display apparatus comprising:
a first substrate having a first surface;
a second substrate having a second surface on an opposite side of the first surface;
a display layer arranged between the first substrate and the second substrate, and having pixels that can transition between a transparent state of transmitting background light and a non-transparent state of displaying an image;
a display region provided in a region where the first substrate, the second substrate, and the display layer overlap;
a controller controlling a state of the pixels of the display layer; and
the image displayed in the display region from a side of the first surface and a background on a side of the second surface being visible to a first user on the first surface side of the display region, and the image displayed in the display region from the second surface side and the background on the first surface side being visible to a second user on the second surface side of the display region,
wherein a sensor device for detecting a viewpoint of the first user on the first surface side of the display region is provided, and
the controller:
displays a plurality of individually selectable selection images toward the first user in the display region;
determines a gaze image, which is the selection image gazed by the first user, from detection information of the sensor device; and
controls the state of the pixels at the viewpoint so that a corresponding image based on the gaze image is displayed to the second user on the opposite side of the first user in the display region, wherein the corresponding image is a reverse image obtained by reversing the gaze image toward the second user.

2. The transparent display apparatus according to claim 1, wherein the corresponding image is an enlarged image obtained by enlarging the gaze image.

3. The transparent display apparatus according to claim 1, wherein the corresponding image is a discolored image obtained by changing a display color of the gaze image.

4. The transparent display apparatus according to claim 1, wherein the selection image is a character image including alphabet.

5. The transparent display apparatus according to claim 1, wherein the selection image is a registration image including a plurality of character images registered in advance.

6. The transparent display apparatus according to claim 1, wherein the controller controls the state of the pixels so that the corresponding image is displayed in a second region different from the first region of displaying the selection image in the display region.

7. The transparent display apparatus according to claim 1, wherein the sensor device is for further detecting a viewpoint of the second user on the second surface side of the display region, and the controller:

displays, as the selection image, a plurality of first selection images directed to the first user and a plurality of second selection images directed to the second user in the display region;

determines a first gaze image, which is the first selection image gazed by the first user, from detection information of the sensor device, and controls the state of the pixels so that the first corresponding image based on the first gaze image is displayed to the second user; and determines a second gaze image, which is the second selection image gazed by the second user, from the detection result of the sensor device, and controls the state of the pixels so that a second corresponding image based on the second gaze image is displayed to the first user.

8. The transparent display apparatus according to claim 7, wherein the controller controls the state of the pixels so that a first state of displaying the first selection image in the display region and a second state of displaying the second selection image in the display region is switched according to a request from the first user or the second user.

9. The transparent display apparatus according to claim 1, wherein the display layer is a liquid crystal layer, and a light source for supplying light source light to the liquid crystal layer is provided at a position that does not overlap the display region.

* * * * *